(12) United States Patent
Ren et al.

(10) Patent No.: US 8,952,600 B2
(45) Date of Patent: Feb. 10, 2015

(54) CIRCULARLY POLARIZING PLATE AND THREE-DIMENSIONAL IMAGE DISPLAY APPARATUS

(75) Inventors: Rieko Ren, Kunitachi (JP); Koji Tasaka, Hino (JP); Kouji Tashiro, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/344,000

(22) PCT Filed: Jul. 20, 2012

(86) PCT No.: PCT/JP2012/068433
§ 371 (c)(1), (2), (4) Date: Mar. 10, 2014

(87) PCT Pub. No.: WO2013/038807
PCT Pub. Date: Mar. 21, 2013

(65) Prior Publication Data
US 2014/0225499 A1    Aug. 14, 2014

(30) Foreign Application Priority Data
Sep. 16, 2011 (JP) ................. 2011-202510

(51) Int. Cl.
*H01J 5/16* (2006.01)
*H01J 61/40* (2006.01)
*H01K 1/26* (2006.01)
*H01K 1/30* (2006.01)
*G02B 27/26* (2006.01)

(52) U.S. Cl.
CPC .............. *G02B 27/26* (2013.01); *G02B 5/3038* (2013.01)
USPC ....................................... 313/112

(58) Field of Classification Search
CPC .............................. G02B 5/3083; G02B 27/26
USPC ............. 313/504, 110, 112, 512; 359/489.07; 349/15, 98
See application file for complete search history.

(56) References Cited

U.S. PATENT DOCUMENTS

2009/0161045 A1*  6/2009  Kawamoto et al. ............. 349/98
2013/0044267 A1*  2/2013  Ishiguro et al. ................. 349/15

FOREIGN PATENT DOCUMENTS

| JP | A-H08-201942 | 8/1996 |
|---|---|---|
| JP | 2007-003760 A | 1/2007 |
| JP | A-2009-132136 | 6/2009 |
| JP | A-2009-251288 | 10/2009 |
| JP | 2010-262145 A | 11/2010 |
| JP | 2012-068438 A | 4/2012 |

OTHER PUBLICATIONS

International Preliminary Report on Patentability in Japanese and English and Written Opinion for International Application No. PCT/JP2012/068433. Date of Issuance: Mar. 18, 2014(8 pages).

* cited by examiner

*Primary Examiner* — Andrew Coughlin
*Assistant Examiner* — Glenn Zimmerman
(74) *Attorney, Agent, or Firm* — Lucas & Mercanti, LLP

(57) ABSTRACT

A circularly polarizing plate has a polarizer and two λ/4 plates (T1, T2) bonded respectively onto both sides of the polarizer so as to face each other, the circularly polarizing plate is characterized in that the in-plane retardation values Ro of the λ/4 plates (T1) and the λ/4 plates (T2) satisfy (a) to (c) below in an environment with a temperature of 23° C. and RH of 55%. (a) The in-plane retardation value Ro of the λ/4 plates (T1), when measured within the range of 450 to 650 nm, is 3.0 to 20.0 nm smaller than the in-plane retardation value Ro of the λ/4 plates (T2). (b) The in-plane retardation value Ro of the λ/4 plates (T1) (450) falls within the range of 110 to 140 nm. (c) The in-plane retardation value Ro of the λ/4 plates (T2) (650) falls within the range of 145 to 165 nm.

5 Claims, 3 Drawing Sheets

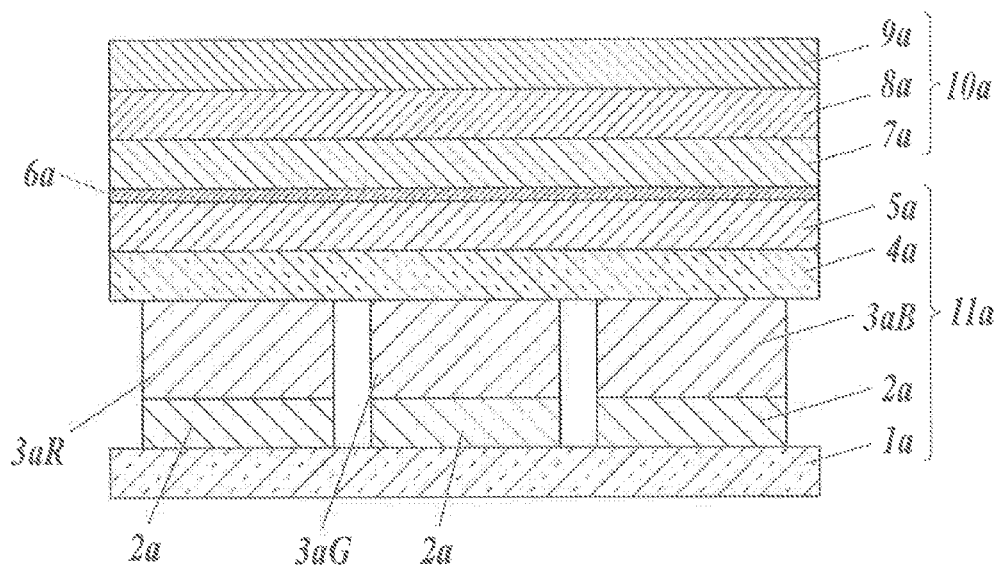
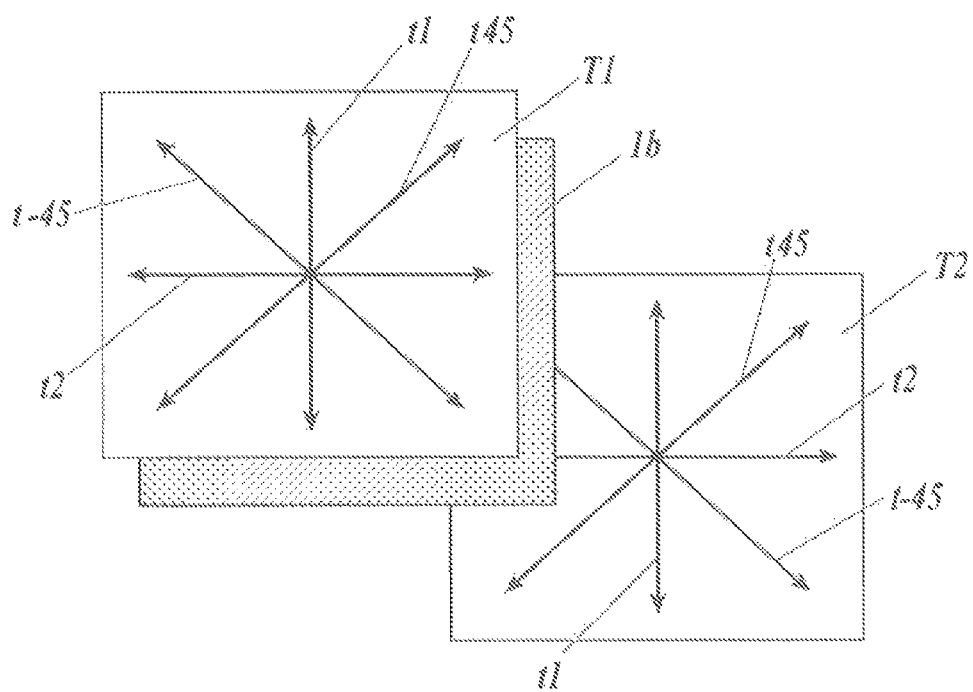

ial image display apparatus, and more specifically to a circularly polarizing plate used for a three-dimensional (stereoscopic) image display apparatus, and an organic electroluminescence image display apparatus provided with a function for displaying three-dimensional (stereoscopic) images.

CIRCULARLY POLARIZING PLATE AND THREE-DIMENSIONAL IMAGE DISPLAY APPARATUS

CROSS REFERENCE TO RELATED APPLICATION

This Application is a 371 of PCT/JP2012/068433 filed on Jul. 20, 2012 which, in turn, claimed the priority of Japanese Patent Application No. JP2011-202510 filed on Sep. 16, 2011 both applications are incorporated herein by reference.

TECHNICAL FIELD

The present invention relates to a circularly polarizing plate and a three-dimensional (stereoscopic) image display apparatus, and more specifically to a circularly polarizing plate used for a three-dimensional (stereoscopic) image display apparatus, and an organic electroluminescence image display apparatus provided with a function for displaying three-dimensional (stereoscopic) images.

BACKGROUND ART

In the field of stereoscopic (3D) image display apparatus, there has been an increasing demand for λ/4 plate which functions to convert linearly polarized light of a specific wavelength into circularly polarized light.

Among several known systems of stereoscopic image display apparatus, one known system is such as allowing the viewer, who wears glasses with a liquid crystal shutter function for viewing stereoscopic images, to recognize two-dimensional images as stereoscopic (three-dimensional: 3D) images. One promising system at present is such as displaying right-eye images and left-eye images, as parallax images, on a display screen, while sequentially and alternately switching them, and allowing the viewer who wears the glasses for viewing stereoscopic images to view the images on the liquid crystal display (see Patent Document 1, for example).

This sort of stereoscopic image display apparatus, configured by the liquid crystal display and the glasses for viewing stereoscopic images, however, suffers from seeing double (also referred to as crosstalk) due to lowered luminance or hue changes, when the viewer tilts the head. The λ/4 plate is effectively used on the viewing side of the liquid crystal display, for the purpose of suppressing decrease in the luminance and hue changes when the head is tilted.

More recently, there has been a growing need of organic electroluminescence (also referred to as organic EL) image display apparatus characterized by lower power consumption and small-sized surface emission element, and this consequently increases a need for organic EL image display apparatus with a function for displaying stereoscopic images.

The organic EL image display apparatus needs a circularly polarizing plate with a λ/4 plate incorporated therein, in order to avoid hue degradation due to reflected light from a metal electrode. Accordingly, the circularly polarizing plate of this invention uses a λ/4 plate (referred to as "λ/4 plate T2", hereinafter) on the luminescent layer side in order to block reflection on the metal electrode of the organic EL image display apparatus, and a λ/4 plate (referred to as "λ/4 plate T1", hereinafter) on the viewer's side in order to prevent the crosstalk in the stereoscopic images (also referred to as 3D images).

For the purpose of completely blocking the reflected light in the visible light range on the organic EL image display apparatus, it is now necessary to establish λ/4 phase difference over the entire wavelength of visible light. However, improvement in the wavelength dispersion of the phase difference is basically in a trade-off relation with the phase difference per se, and is difficult. In some wavelength range, the reflected light is blocked only with difficulty, wherein the reflected light in the red region, where the luminous efficiency is high, will degrade visibility. This has, however, not understood as a serious problem in the visibility for the general EL image display apparatuses, so long as the reflected light in the red region, where the luminous efficiency is high, is successfully blocked by setting a relatively large level of phase difference of the λ/4 plate.

The organic EL image display apparatus imparted with the 3D image function was, however, found to cause crosstalk in the 3D image, due to reflected light in the blue region which could not be blocked by the circularly polarizing plate.

On the other hand, Patent Document 2 and Patent Document 3 disclose the organic EL display apparatuses and circularly polarizing plates provided with a cellulose ester film, while making no description on possibility of imparting the 3D image function or any associated problems mentioned above.

CITATION LIST

Patent Literature

[Patent Document 1] JP-A-H08-201942
[Patent Document 2] JP-A-2009-251288
[Patent Document 3] JP-A-2009-132136

SUMMARY OF THE INVENTION

Problem to be Solved by the Invention

The present invention was conceived considering the problems and statuses described above, wherein the solution is to provide a circularly polarizing plate improved in the crosstalk due to degradation in the red phase and reflected light in the blue region when incorporated into the organic electroluminescence image display apparatuses with the stereoscopic image display function, and to provide a stereoscopic image display apparatus using the circularly polarizing plate. Another solution is to provide a circularly polarizing plate free from anticipation of panel warp possibly occurs in the organic electroluminescence image display apparatuses.

Solution to Problem

The present inventors found out, from our thorough investigations to solve the above-described problems, that the crosstalk due to the reflected light in the blue region in the 3D image is successfully suppressed, by setting the in-plane retardation value Ro of the λ/4 plate T2, used for the circularly polarizing plate composing the organic electroluminescence image display apparatus, to a relatively large value so as to block the reflected light in the red region, and by setting the in-plane retardation value Ro of the λ/4 plate T1, composing the stereoscopic image display apparatus, to a relatively small value. The findings led us to complete the present invention.

The above-described problems relevant to the present invention may be solved by the configurations below.

1. A circularly polarizing plate including a polarizer and two λ/4 plates bonded on both sides of the polarizer so as to face each other, in which in-plane retardation values Ro of one λ/4 plate (referred to as "λ/4 plate T1", hereinafter) and other λ/4 plate (referred to as "λ/4 plate T2", hereinafter)

satisfy following conditions (a) to (c), when measured in an environment with a temperature of 23° C. and a relative humidity of 55%:

(a) the in-plane retardation value Ro of the λ/4 plate T1 is 3.0 to 20.0 nm smaller than the in-plane retardation value Ro of the λ/4 plate T2, when measured in the range from 450 to 650 nm;

(b) the in-plane retardation value Ro(450) of the λ/4 plate T1 measured at a measurement wavelength of 450 nm falls in the range from 110 to 140 nm; and (c) the in-plane retardation value Ro(650) of the λ/4 plate T2 measured at a measurement wavelength of 650 nm falls in the range from 145 to 165 nm.

2. The circularly polarizing plate according to aspect 1, in which both of the λ/4 plate T1 and the λ/4 plate T2 contain 70% by mass or more of a cellulose acetate having a total degree of acyl substitution in the range from 2.0 to 2.7.

3. The circularly polarizing plate according to aspect 1 or 2, in which both of the λ/4 plate T1 and the λ/4 plate T2 are formed by diagonal stretching.

4. The circularly polarizing plate according to any one of aspects 1 to 3, in which a tension of the λ/4 plate T2, defined by an equation below, relative to a tension of the λ/4 plate T1 falls in the range from 0.7 to 1.30 in an entire plane bonded to the polarizer:

tension=elastic modulus×film thickness (kN/m)  (Equation)

5. A three-dimensional (stereoscopic) image display apparatus which includes the circularly polarizing plate described in any one of aspects 1 to 4, and an organic electroluminescent element.

Advantageous Effects of the Invention

By virtue of the configurations described above, the present invention now successfully provides a circularly polarizing plate improved in the degradation in the red phase and the crosstalk in the blue region when incorporated into the organic electroluminescence image display apparatus provided with the stereoscopic image display function, and to provide an organic electroluminescence image display apparatus with the stereoscopic image display function, improved in the degradation in the red phase and the crosstalk in the blue region. The present invention also successfully provides an organic electroluminescence image display apparatus free from the panel warp.

(Mechanism of the Present Invention)

A development mechanism or an action mechanism of the effects of the present invention is supposed as follows, although the details still remain unclear.

The organic EL image display apparatuses have successfully blocked the reflected light on the metal electrode by the circularly polarizing plate having the λ/4 plate incorporated therein, but were difficult to establish a phase difference of λ/4 over the wide region (in the visible light region from approximately 450 to 550 nm) so as to completely block the visible light. The organic EL image display apparatuses imparted with the stereoscopic (3D) function have suffered from the crosstalk due to the residual light which has not been blocked. In the present invention, the phase difference of the λ/4 plate T2 (luminescent layer) is set to a relatively high value, so as to predominantly block the reflected light in the red region where the luminous efficiency is high. While the light in the blue region (short wavelength light) would leak, the luminous efficiency is low, and is of no problem in the general organic EL image display apparatuses. However, in the organic electroluminescence image display apparatuses with the stereoscopic image display function, the leaked short wavelength light will cause the crosstalk in the blue region. Accordingly, the λ/4 plate T1 with a relatively small phase difference, provided also on the front surface side (viewer's side), is supposed to convert the leaked short wavelength light into circularly polarized light, to thereby improve the crosstalk.

BRIEF DESCRIPTION OF DRAWINGS

FIG. 1 is a schematic diagram illustrating a structure of a stereoscopic image display apparatus of the present invention, FIG. 2 is a conceptual diagram illustrating directions of measurement of tension of the λ/4 plates T1, T2.

DESCRIPTION OF EMBODIMENTS

Figure 3:
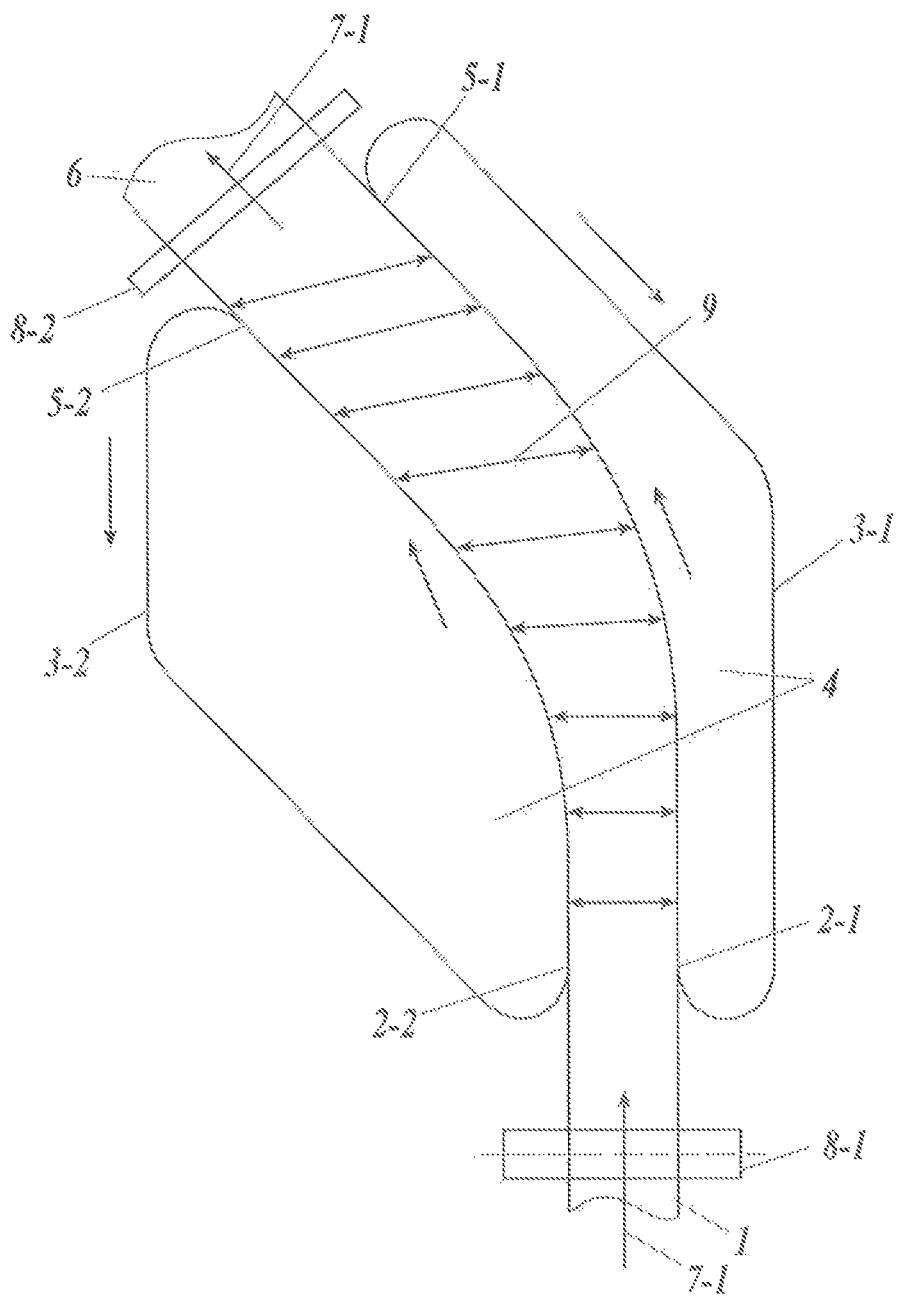
FIG. 3 is a schematic diagram illustrating a track of rails (rail pattern) of a tenter used for diagonal stretching.

The circularly polarizing plate of the present invention has a polarizer, and two λ/4 plates bonded on both sides of the polarizer so as to face each other, and is characterized by that one λ/4 plate (referred to as "λ/4 plate T1", hereinafter), and the other λ/4 plate (referred to as "λ/4 plate T2", hereinafter) having in-plane retardation values Ro which satisfy the conditions (a) to (c) described above, in an environment with a temperature of 23° C. and a relative humidity of 55%. This technical feature is common to all of the inventions described in Claims 1 to 5.

In one embodiment of the present invention, from the viewpoint of developing the effect of the present invention, both of the λ/4 plate T1 and the λ/4 plate T2 composing the circularly polarizing plate contain 70% by mass or more of cellulose acetate having the total degree of acyl substitution in the range from 2.0 to 2.7, so as to appropriately adjust the in-plane retardation value Ro and wavelength dispersion characteristics (relation between wavelength and Ro).

In the present invention, it is further preferable that both of the λ/4 plate T1 and the λ/4 plate T2 are manufactured by diagonal stretching, from the viewpoint that the polarizing plate is manufacturable in a roll-to-roll manner, with expected effects of improving the productivity and cost saving.

It is further preferable in the present invention that the tension of the λ/4 plate T2 falls in the range from 0.7 to 1.30 times that of the λ/4 plate T1, over the entire plane of bonding to the polarizer, from the viewpoint of obtaining an effect of improving panel warp.

The circularly polarizing plate of the present invention is preferably possessed by an organic electroluminescence image display apparatus with a stereoscopic image display function. This ensures an effect of suppressing degradation in the red phase and crosstalk due to reflected light in the blue region when incorporated into the display apparatus.

The present invention, constituents thereof, and modes and embodiments for implementing the present invention will be detailed below. Note that the wording "to" with preceding and succeeding numerals will be used to indicate numerical ranges with the lower limit and upper limit values defined by these numerals.

[Outline of Circularly Polarizing Plate of Present Invention]

The circularly polarizing plate of the present invention has a polarizer, and two λ/4 plates bonded on both sides thereof in an opposed manner, one λ/4 plate (referred to as "λ/4 plate T1", hereinafter), and the other λ/4 plate (referred to as "λ/4 plate T2", hereinafter) having in-plane retardation Ro values which satisfy the conditions (a) to (c), in an environment with a temperature of 23° C. and a relative humidity of 55%:

(a) the in-plane retardation Ro of the λ/4 plate T1 is 3.0 to 20.0 nm smaller than the in-plane retardation Ro of the λ/4 plate T2, when measured in the range from 450 to 650 nm;

(b) the in-plane retardation Ro(450) of the λ/4 plate T1 falls in the range from 110 to 140 nm, when measured at a measurement wavelength of 450 nm; and (c) the in-plane retardation Ro(650) of the λ/4 plate T2 falls in the range from 145 to 165 nm, when measured at a measurement wavelength of 650 nm.

The circularly polarizing plate is configured to have a phase difference plate composed of quarter wave plates as described above, and is used while adjusting the angle between the polarizing directions of the polarizing plate and each phase difference plate to π/4, so as to block the mirror reflection on the metal electrode of the organic electroluminescence element. The quarter wave plate T2 (on the luminescent layer side) used in the present invention for blocking the mirror reflection is a wide-band λ/4 plate. The wide-band λ/4 plate gives a phase difference of quarter wavelength over the entire range of the visible light region, that is, a λ/4 plate showing reverse wavelength dispersion (Ro(450)<Ro(550)<Ro(650)). While the wide-band λ/4 plate is also achievable in a positive wavelength dispersion system by laminating a λ/4 plate and a λ/2 plate, the lamination may unfortunately elevate phase difference (Rt) in the thickness-wise direction or may degrade the visibility due to misalignment of the axes. Now in the present invention, the λ/4 plate which successfully attains the wide-band performance by a single layer using a material showing the reverse phase difference, such as cellulose acetate, is preferable from the viewpoint not only of visibility, but also of cost and productivity.

The wavelength dispersion of the λ/4 plate T2, represented by a ratio given by Ro(450)/Ro(650), is smaller than 1.00, preferably 0.50 to 0.98, more preferably 0.60 to 0.95, and most preferably 0.65 to 0.92. It is particularly preferable to establish a difference of λ/4 over the green to red region, where the luminous efficiency is high, since a large effect of improving the hue is recognizable. The ratio given by Ro(550)/Ro(650) is preferably 0.98 or below, more preferably 0.96 or below, and furthermore preferably 0.94 or below. In these ranges, the reflected light in the red region is blocked, and the contrast of image is improved.

In the circularly polarizing plate of the present invention, while the λ/4 plate T1 (viewer's side) opposed to the λ/4 plate T2 is not always necessarily a wide-band λ/4 plate, it preferably has a ratio given by Ro(450)/Ro(650) of 1.20 or below, more preferably 0.50 to 1.00, and furthermore preferably 0.65 to 0.95. In these ranges, an effect of improving the crosstalk in the stereoscopic image is obtainable.

Since the organic electroluminescent element is likely to degrade by UV, so that the circularly polarizing plate preferably has a UV absorbing function. A protective film on the viewer's side preferably has the UV absorbing function, since both of the polarizer and the organic electroluminescent element are protected from UV. The organic electroluminescent element is more effectively prevented from degrading, if also the λ/4 plate on the luminescent layer side has the UV absorbing function.

From the viewpoints of balancing improvement in the image contrast through blocking of the reflected light and improvement in the crosstalk, it is particularly preferable to set a large phase difference at higher wavelengths for the λ/4 plate T2, and to set a small phase difference at lower wavelengths for the λ/4 plate T1.

Development of the phase difference and the wavelength dispersion are balanced typically by using a cellulose acetate film for the base film, and by adjusting the total degree of acyl substitution. Cellulose acetate, intrinsically showing reverse wavelength dispersion, is suitable for manufacturing the wide-band λ/4 plate. If the total degree of acyl substitution thereof is small, the phase difference will be well developed, whereas the wavelength dispersion will be flattened. If the total degree of acyl substitution is elevated, the reverse wavelength dispersion will be achieved, whereas the phase difference will be less developed. A possible method of enhancing the phase difference, without degrading the wavelength dispersion, is to control stretching conditions (temperature, factor of stretching). By appropriately combining the methods, it will now be possible to achieve a preferable combination of phase difference values of T1 and T2.

In the stretching, it is preferable to adopt diagonal stretching while setting the angle of the slow axis to 45°±5°, since the method enables roll-to-roll bonding in the process of manufacturing the polarizing plate, and thereby improves the productivity.

The circularly polarizing plate having the λ/4 plates, manufactured by stretching, bonded on both sides of the polarizer was however found to largely curl. The curl has not been obvious in the liquid crystal display apparatuses, since the panel thereof is originally thick and is bonded on both sides with the polarizing plates, which cancels the curl. In contrast, the organic EL image display apparatus uses only a single circularly polarizing plate for most cases, so that the curl of the circularly polarizing plate will directly cause panel warp.

The problem was successfully solved by bonding the λ/4 plates T1, T2 in the directions by which the tension is equally developed in all in-plane directions.

In the present invention, the tension is given by the equation below.

Tension (kN/m)=Elastic modulus (GPa)×Film thickness (μm)

[In-Plane Retardation Ro of Film]

As for the in-plane retardation Ro in the present invention, the λ/4 plate T1 has an in-plane retardation Ro(450) of 110 to 140 nm, and more preferably 110 to 130 nm. If the in-plane retardation Ro(450) of the λ/4 plate T1 is smaller than 110 nm, or more than 140 nm, leakage of blue light will increase, and thereby the blue phase and crosstalk will degrade. The λ/4 plate T2 preferably has an in-plane retardation Ro(650) of 145 to 165 nm, and more preferably 155 to 165 nm. If the in-plane retardation Ro(650) of the λ/4 plate T2 is smaller than 145 nm, or more than 165 nm, leakage of red light will increase, and thereby the red phase and crosstalk will degrade. Both of the λ/4 plate T1 and the λ/4 plate T2 preferably have Ro(550) values of 130 to 150 nm.

The in-plane retardation Ro is given by the equation below, and may be measured typically under an environment of 23° C., 55% RH, using a polarimeter/phase difference analyzer "AxoScan OPMF", from Opto Science, Inc.

$Ro=(nx-ny) \times d$ (In the equation, nx represents refractive index in the in-plane, x-direction or the direction of slow axis, ny represents refractive index in the in-plane, y-direction orthogonal to the x-direction, and d represents film thickness (nm). The refractive index is measured at 23° C., 55% RH.)

[Tension of Film]

In the present invention, the tension of the λ/4 plate T2, defined by the equation below, preferably falls in the range from 0.7 to 1.30 times that of the λ/4 plate T1, over the entire plane of bonding to the polarizer.

Curl (warp) of the polarizing plate was found to occur, when the polarizer shrinks, while inwardly directing either one of two protective films having smaller tension. In the present invention, the tension is given by the equation below.

Tension (kN/m)=Elastic modulus (GPa)×Film thickness (μm)

As for liquid crystal display apparatuses, JP-A-2007-256637 for example discloses a technique of improving the curl of the polarizing plate, using a transversely stretched cellulose acetate film with an elastic modulus of 3.4 to 4.4. This is, however, directed to improve the productivity of the liquid crystal panel through improvement in the curl of polarizing plate, and is not directed to suppress the panel warp in the organic electroluminescence image display apparatus. Moreover, there is no description on nonconformities due to unbalanced tension of the protective films on both sides.

Even if the film should be adopted to the image display apparatus of the present invention, the balance of tension on both sides would degrade depending on the direction of bonding, only to fail to obtain the effect.

Ratio of tension of the λ/4 plate T2 to that of the λ/4 plate T1 used in the image display apparatus of the present invention preferably falls in the range from 0.70 to 1.30 over the entire plane of bonding, and more preferably 0.90 to 1.10. In these ranges, the effect of suppressing the panel warp is achieved.

FIG. 2 illustrates directions of measurement of the tension of the λ/4 plate T1 and the λ/4 plate T2. That is, the ratio represented by (tension of T1)/(tension of T2), or the ratio of tension of the λ/4 plates T1 and T2, may be determined by measuring in four directions including machine direction t1, width-wise direction t2, direction $t_{45}$ 45° away from the machine direction, and direction $t_{-45}$ −45° away from the machine direction.

The tension of the λ/4 plate T1 and the λ/4 plate T2 is preferably 100 to 500 kN/m, more preferably 200 to 400 kN/m, and most preferably 250 to 350 kN/m. If the tension is adjusted in these ranges, the film strength is appropriately adjusted, thus preferably attaining a proper level of reworkability.

[Function of λ/4 Plate]

The circularly polarizing plate of the present invention characteristically has a polarizer, and two λ/4 plates bonded on both surfaces thereof in an opposed manner. A base film composing these two λ/4 plates has a λ/4 plate function. The λ/4 plate refers to an article which functions to convert linearly polarized light of a certain specific wavelength into circularly polarized light (or, converting circularly polarized light into linearly polarized light). The λ/4 plate is designed to give an in-plane retardation value (phase difference value) Ro of approximately ¼, with respect to light of a predetermined wavelength (generally in the visible region).

The λ/4 plate function as described above may be given by controlling the total degree of acyl substitution typically by using cellulose acetate for the base film, to thereby control the degree of development of phase difference and wavelength dispersion. Cellulose acetate, intrinsically showing reverse wavelength dispersion, is suitable for manufacturing the wide-band λ/4 plate. If the total degree of acyl substitution thereof is small, the phase difference will be well developed, whereas the wavelength dispersion will be flattened. If the total degree of acyl substitution is elevated, the reverse wavelength dispersion will be achieved in a successful manner, whereas the phase difference will be less developed. A possible method of enhancing the phase difference, without degrading the wavelength dispersion, is to control stretching conditions (temperature, factor of stretching). By appropriately combining the methods, it will now be possible to achieve a preferable combination of phase difference values of the λ/4 plates T1 and T2.

[Base Film]

The base film relevant to the present invention is preferably a λ/4 plate mainly containing a thermoplastic resin, and is preferably easy to manufacture, easy to be bonded with an antiglare layer, and is optically isotropic. If configured as a based film containing the thermoplastic resin, the λ/4 plate may now be used as a polarizing plate protective film.

The base is arbitrary so long as it has these features, and is selectable for example from cellulose ester-based films such as triacetyl cellulose film, cellulose acetate propionate film, cellulose diacetate film, and cellulose acetate butyrate film; polyester-based films such as polyethylene terephthalate, and polyethylene naphthalate; polycarbonate-based film, polyarylate-based film, polysulfone (including polyethersulfone)-based film, polyethylene film, polypropylene film, cellophane, polyvinylidene chloride film, polyvinyl alcohol film, ethylene vinyl alcohol film, syndiotactic polystyrene-based film, norbornene resin-based film, polymethylpentene film, poly ether ketone film, poly ether ketone imide film, polyamide film, fluorine-containing resin film, nylon film, cycloolefin polymer film, polymethyl methacrylate film and acrylic film.

Among them, preferable are cellulose ester films (for example, Konica Minolta TAC KC8UX, KC4UX, KC5UX, KC8UCR3, KC8UCR4, KC8UCR5, KC8UY, KC4UY, KC4UE, and KC12UR (all from Konica Minolta Opto, Inc.), polycarbonate film, cycloolefin polymer film, and poly ester film. In the present invention, cellulose ester film is particularly preferable from the viewpoints of readiness of obtaining the convex profile described above, manufacturability, and cost.

The base film preferably has a refractive index of 1.30 to 1.70, and more preferably 1.40 to 1.65. The refractive index is measured using Abbe's refractometer 2T from Atago Co., Ltd., by the method specified by JIS K7142.

(Cellulose Ester Film)

Next, the cellulose ester film which is particularly preferable as the base film will be detailed.

While the cellulose ester film is not specifically limited so long as it has the features described above, the cellulose ester resin (also referred to as cellulose ester) is preferably composed of a lower fatty acid ester of cellulose. Lower fatty acid in the lower fatty acid ester of cellulose means fatty acids having six or less carbon atoms. Examples include cellulose acetate, cellulose diacetate, cellulose triacetate, cellulose propionate, cellulose butyrate, and also include mixed fatty acid esters such as cellulose acetate propionate, and cellulose acetate butyrate.

Among the lower fatty acid esters of cellulose described above, particularly preferable ones used herein are cellulose diacetate, cellulose triacetate, and cellulose acetate propionate. These cellulose esters may be used alone, or in a mixed manner.

Cellulose diacetate preferably used herein has an average degree of acetylation (amount of bound acetic acid) of 51.0 to 56.0%. Commercially available products are exemplified by L20, L30, L40 and L50 from Daicel Corporation, and CA398-3, CA398-6, CA398-10, CA398-30 and CA394-60S from Eastman Chemical Company.

Cellulose triacetate preferably used herein has an average degree of acetylation (amount of bound acetic acid) of 54.0 to 62.5%. Cellulose triacetate having an average degree of acetylation of 58.0 to 62.5% is more preferable.

With the average degree of acetylation fallen in these ranges, cellulose triacetate will cause only small dimensional changes, and is preferable from the viewpoint of the degree of polarization when incorporated into the polarizer plate. It is also preferable from the viewpoint of solubility in solvents and productivity.

[Total Degree of Acyl Substitution]

In the circularly polarizing plate of the present invention, it is preferable that both of the λ/4 plate T1 and the λ/4 plate T2 contain 70% by mass or more of cellulose acetate having the total degree of acyl substitution in the range from 2.0 to 2.7.

Cellulose acylate preferably has a total degree of acyl substitution of 2.0 to 2.7, a number average molecular weight (Mn) of 125,000 or larger and smaller than 180,000, a weight-average molecular weight (Mw) of 265,000 or larger and smaller than 360,000, and a Mw/Mn of 1.8 to 2.1.

The total degree of acyl substitution refers to a total of ratios of esterification of hydroxy groups respectively at the 2-position, 3-position and 6-position of a glucose unit which is a repeating unit composing cellulose. More specifically, if hydroxy groups at each of the 2-position, 3-position and 6-position of glucose are completely esterified, then the degree of substitution is 1. Accordingly, if the glucose which composes cellulose is completely esterified at all of the 2-position, 3-position and 6-position, then the total degree of acyl substitution is 3 at most. Portions not substituted by acyl group generally remain in the form of hydroxy groups.

The degree of acyl substitution was determined in accordance with ASTM-D817-96.

Preferable cellulose acylate has $C_{2-4}$ acyl groups as the substituent, and concurrently satisfies both of relations (I) and (II) below, wherein X represents the degree of substitution by acetyl group, and Y represents the degree of substitution by propionyl group.

$$2.6 \leq X+Y \leq 3.0 \qquad \text{Formula (I)}$$

$$0 \leq X \leq 2.5 \qquad \text{Formula (II)}$$

In particular, cellulose acetate propionate is preferably used, especially with $1.9 \leq X \leq 2.5$ and $0.1 \leq Y \leq 0.9$.

Number average molecular weight (Mn) and weight-average molecular weight (Mw) of cellulose ester may be measured by high performance liquid chromatography. Conditions of the measurement are as follows.
Solvent: methylene chloride
Column: Shodex K806, K805, K803G (all from Showa Denko K.K., used by connecting three columns in series)
Column temperature: 25° C.
Sample concentration: 0.1% by mass
Detector: RI Model 504 (from GL Science Inc.)
Pump: L6000 (from Hitachi Ltd.)
Flow rate: 1.0 ml/min
Calibration curve: standard polystyrene STK (from Tosoh Corporation)

A calibration curve determined based on 13 samples ranging from Mw=1,000,000 to 500 was used. These 13 samples are preferably used at approximately regular intervals.

Cellulose acylate in the present invention may be synthesized by any of publicly known methods. Cellulose as an ingredient of cellulose acylate is exemplified, without special limitation, by cotton linter, wood pulp (softwood origin, hardwood origin) and kenaf. The individual types of cellulose acylate obtained therefrom may be used in a mixed manner according to an arbitrary ratio.

In general, cellulose as the ingredient, predetermined organic acid(s) (acetic acid, propionic acid, etc.), acid anhydride(s) (acetic anhydride, propionic anhydride, etc.), and a catalyst (sulfuric acid, etc.) are mixed so as to esterify the cellulose, and the reaction is allowed to proceed until a triester of cellulose produces. In the triester, three hydroxy groups of the glucose unit are substituted by acyl groups of the organic acid. Mixed ester-type cellulose acylate, such as cellulose acetate propionate and cellulose acetate butyrate, may be prepared by using two or more species of organic acid at the same time. Next, the triester of cellulose is hydrolyzed to thereby synthesize the cellulose acylate having a desired degree of acyl substitution. The process is then followed by the steps of filtration, precipitation, washing with water, dewatering, drying and so forth, thereby the cellulose acylate is obtained.

More specifically, the triester of cellulose may be synthesized referring to methods described in JP-A-H10-45804, JP-A-2009-161701 and so forth.

[Cellulose Ester Resin/Acrylic Resin-Containing Film]

The base film used herein may be configured by a film which contains an acrylic resin and a cellulose ester resin, wherein ratio of contents is (acrylic resin):(cellulose ester resin)=95:5 to 50:50.

The acrylic resin includes methacrylic resin. The acrylic resin is preferably composed of 50 to 99% by mass of methyl methacrylate unit, and 1 to 50% by mass of other monomer unit copolymerizable therewith, while not specifically limited. The other copolymerizable monomer is exemplified by alkyl methacrylate with a $C_{2-18}$ alkyl group; alkyl acrylate with a $C_{1-18}$ alkyl group; α,β-unsaturated acids such as acrylic acid and methacrylic acid; unsaturated group-containing dicarboxylic acids such as maleic acid, fumaric acid and itaconic acid; aromatic vinyl compounds such as styrene and α-methylstyrene; α,β-unsaturated nitriles such as acrylonitrile and methacrylonitrile; maleic anhydride, maleimide, N-substituted maleimide and glutaric anhydride. These monomers may be used alone, or two or more species thereof may be used in combination.

Among them, from the viewpoints of resistance to thermal decomposition and of fluidity of the copolymer, preferably used are methyl acrylate, ethyl acrylate, n-propyl acrylate, n-butyl acrylate, s-butyl acrylate and 2-ethylhexyl acrylate, and particularly preferably used are methyl acrylate and n-butyl acrylate. The weight-average molecular weight (Mw) is preferably in the range from 80,000 to 500,000, and more preferably from 110,000 to 500,000.

The weight-average molecular weight of the acrylic resin, including measurement conditions, may be measured by gel permeation chromatography. Methods of preparing the acrylic resin may be arbitrarily selectable from publicly known ones which include suspension polymerization, emulsion polymerization, bulk polymerization, and solution polymerization, without special limitation. Polymerization initiator usable herein includes general peroxide-based and azo-based ones, and also includes redox-type ones. Polymerization may be proceeded at a temperature of 30 to 100° C. for the emulsion or emulsion polymerization, and 80 to 160° C. for the bulk or solution polymerization. The polymerization may be allowed to proceed using, for example, alkyl mercaptan as a chain transfer agent, in order to control the reduced viscosity of the copolymer. The polymerization initiator is also commercially available, and is exemplified by Delpet 60N, 80N (from Asahi Kasei Chemicals Corporation), Dianal BR52, BR80, BR83, BR85, BR88 (from Mitsubishi Rayon Co., Ltd.), and KT75 (from Denki Kagaku Kogyo KK). Two or more acrylic resins may be used in combination. The acrylic resin may be a graft copolymer composed of a copolymer of (meth)acrylic rubber and aromatic vinyl compound, grafted with (meth)acrylic resin. The graft copolymer is preferably a core/shell-type graft copolymer having a core composed of a copolymer of (meth)acrylic rubber aromatic vinyl compound, and a surrounding shell composed of a (meth)acrylic resin.

The total mass of the acrylic resin and the cellulose ester resin in the base film is preferably 55% by mass or more of the base film, more preferably 60% by mass or more, and particularly 70% by mass or more. The base film may be composed by adding a resin other than the acrylic resin and cellulose ester resin, and additive(s).

(Acrylic Particle)

The base film may also contain an acrylic particle in view of improving the brittleness. The acrylic particle is an acrylic component which exists in the form of particle (also referred to as incompatible state) in the base film which contains the acrylic resin and the cellulose ester resin compatible to each other.

The acrylic particle is preferably a acrylic particle composite having a multi-layered polymer, while not specifically limited. The acrylic particle composite, which is a multi-layered polymer, is commercially available as "Metablen" from Mitsubishi Rayon Co., Ltd., "Kane Ace" from Kaneka Corporation, "Paraloid" from Kureha Corporation, "Acryloid" from Rohm and Haas Company, "Staphyloid" from Ganz Chemical Co., Ltd. and "Parapet SA" from Kuraray Co., Ltd., which may be used alone, or as a mixture of two or more species. When the base film is added with the acrylic particle, it is preferable that the refractive index of a mixture of the acrylic resin and the cellulose ester resin is close to the refractive index of the acrylic particle, in view of obtaining a highly-translucent film. More specifically, difference of the refractive indices between the acrylic particle and the acrylic resin is preferably 0.05 or smaller, more preferably 0.02 or smaller, and particularly 0.01 or smaller.

Content of the acrylic particle, relative to the total mass of the acrylic resin and the cellulose ester resin composing the film is preferably given by (acrylic particle):(total mass of acrylic resin and cellulose ester resin)=0.5:100 to 30:100, on the basis of content by mass, in view of good development of the desired effect, and more preferably given by (acrylic particle):(total mass of acrylic resin and cellulose ester resin) =1.0:100 to 15:100.

(Fine Particle)

In order to improve the handleability, the base film in this embodiment preferably contains a matting agent such as inorganic fine particle typically composed of silicon dioxide, titanium dioxide, aluminum oxide, zirconium oxide, calcium carbonate, kaolin, talc, calcined calcium silicate, hydrated calcium silicate, aluminum silicate, magnesium silicate or calcium phosphate; or crosslinked polymer. Among them, silicon dioxide is preferably used for its ability to reduce haze of the film.

Primary average particle size of the fine particle is preferably 20 nm or smaller, more preferably 5 to 16 nm, and particularly 5 to 12 nm.

(Other Additives)

[Plasticizer]

The base film may also contain a plasticizer, aiming at improving fluidity or flexibility of the composition. The plasticizer is exemplified by those of phthalic ester base, aliphatic ester base, trimellitic ester base, phosphoric ester base, polyester base, and epoxy base. Among them, the polyester-based and phthalic ester-based plasticizers are preferably used. The polyester-based plasticizer is superior to phthalic ester-based plasticizer such as dioctyl phthalate, in terms of excellence in non-migrating property and antileaching property. The plasticizers are adoptable to a wide variety of applications, by appropriately selecting or combining them in accordance with the applications.

The polyester-based plasticizer is a sort of reaction product derived from mono- to tetracarboxylic acids and mono- to hexahydric alcohol, wherein a reaction product derived from a dicarboxylic acid and a glycol is mainly used. Representative dicarboxylic acids include glutaric acid, itaconic acid, adipic acid, phthalic acid, azelaic acid, and sebacic acid. The polyester-based plasticizer is preferably an ester-based plasticizer having the aromatic terminal. The ester-based plasticizer having the aromatic terminal is preferably an ester compound having a structure as a result of reaction among phthalic acid, adipic acid, at least one species of benzene monocarboxylic acid, and at least one species of $C_{2-12}$ alkylene glycol. It suffices that the final compound structure has an adipic acid residue and a phthalic acid residue. In the process of manufacturing the ester compound, the dicarboxylic acid may be used in the form of acid anhydride or esterified product.

The benzene monocarboxylic acid is exemplified by benzoic acid, para tertiary butyl benzoic acid, ortho toluic acid, meta toluic acid, para toluic acid, dimethyl benzoic acid, ethyl benzoic acid, normal propyl benzoic acid, aminobenzoic acid, and acetoxy benzoic acid, wherein benzoic acid is most preferable. They may be used alone, or as a mixture of two or more species.

The $C_{2-12}$ alkylene glycol component is exemplified by ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylolpropane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. Among them, 1,2-propylene glycol is particularly preferable. These glycols may be used alone, or as a mixture of two or more species.

The aromatic terminal ester-based plasticizer may be either of oligoester type and polyester type. The molecular weight preferably falls in the range from 100 to 10,000, and more preferably 350 to 3000. The acid value is 1.5 mg KOH/g or smaller, and the hydroxy value is 25 mg KOH/g or smaller. More preferably, the acid value is 0.5 mg KOH/g or smaller, and the hydroxy value is 15 mg KOH/g or smaller.

The amount of addition of the plasticizer is preferably 0.5 to 30 parts by mass, per 100 parts by mass of the base film. More specifically, the plasticizer is exemplified by the compounds (2-1 to 2-10) below, but without being limited thereto.

[Chemical Formula 1]

2-1

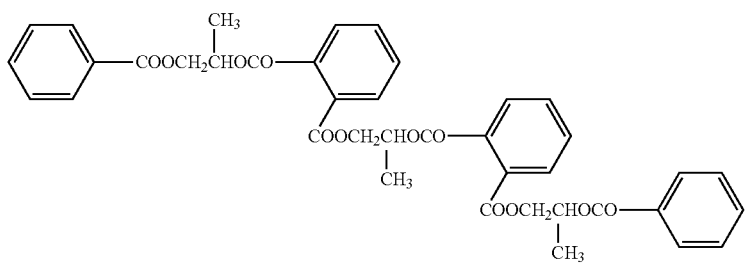

Mw: 696

-continued
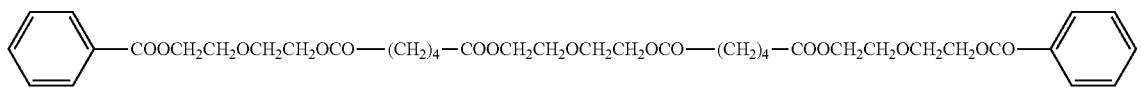
2-2
Mw: 746
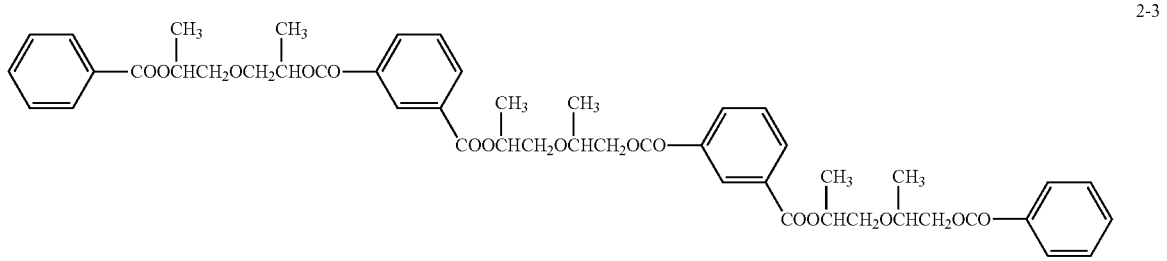
2-3
Mw: 830
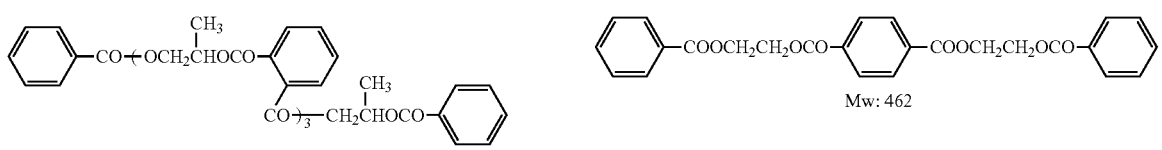
2-4
Mw: 886
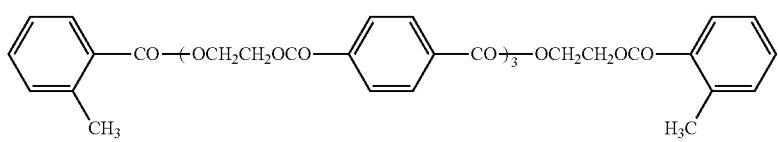
2-5
Mw: 462
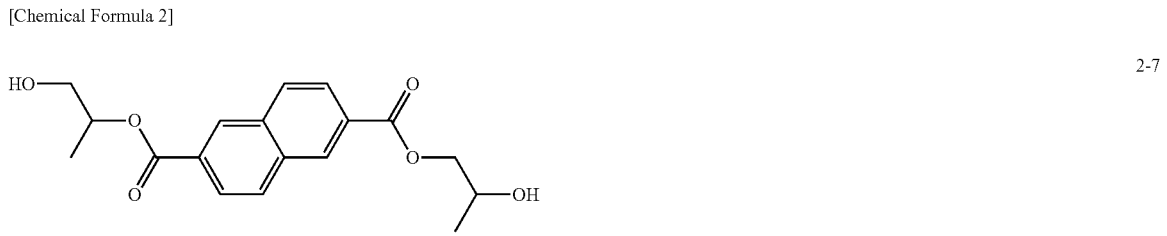
2-6
Mw: 874
[Chemical Formula 2]
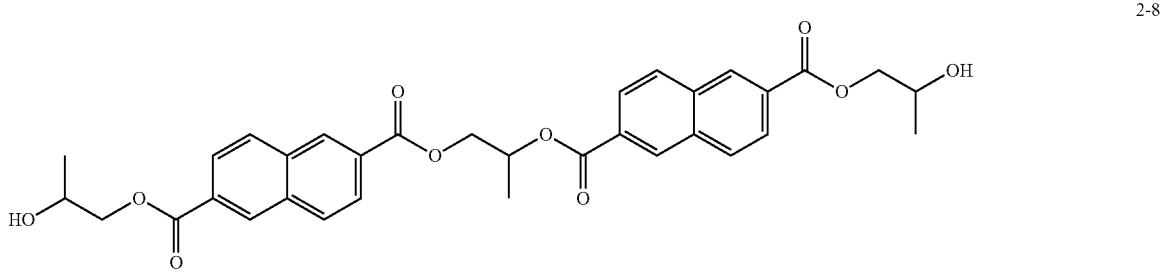
2-7
2-8
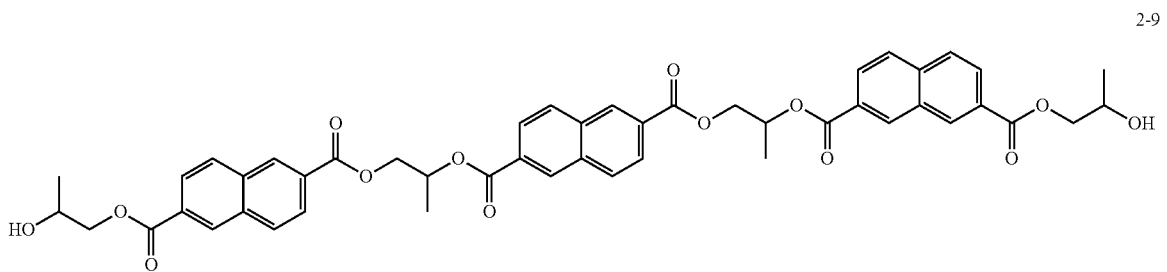
2-9

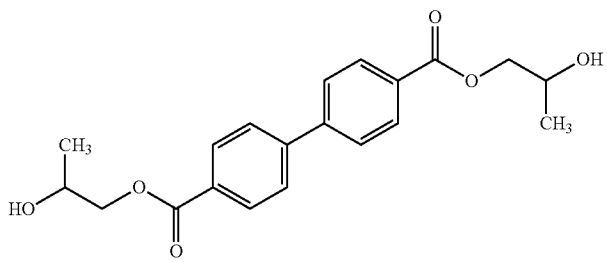

The base film may further contain a sugar ester compound. The sugar ester compound refers to compounds obtained by esterifying all of, or a part of, OH group(s) of sugar such as monosaccharide, disaccharide, trisaccharide or oligosaccharide, and is more specifically exemplified by compounds represented by the formula (1) below.

[Chemical Formula 3]

General Formula (1)

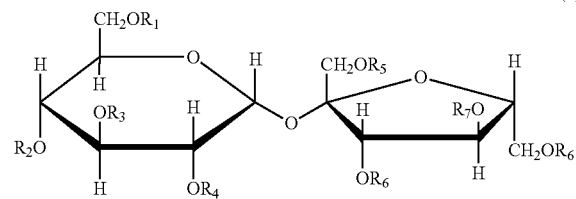

(in the formula, each of $R_1$ to $R_8$ independently represents a hydrogen atom, substituted or unsubstituted $C_{2-22}$ alkylcarbonyl group, or, substituted or unsubstituted $C_{2-22}$ arylcarbonyl group, where $R_1$ to $R_8$ may be same or different ($R_1$ to $R_8$ other than hydrogen atom are referred to as "acyl group", hereinafter.))

More specific examples of the compounds (Compound 1-1 to Compound 1-23) represented by the formula (1) will be shown below, without being limited thereto.

General formula (1)

| COMPOUND No. | $R_1$-$R_8$ | AVERAGE DEGREE OF SUBSTITUTION |
|---|---|---|
| [Chemical Formula 4] | | |
| 1-1 | —C(=O)—CH₃ | 6.0 |
| 1-2 | —C(=O)—CH₃ | 6.1 |
| 1-3 | —C(=O)—CH₃ | 6.5 |
| 1-4 | —C(=O)—CH₃ | 6.9 |
| 1-5 | —C(=O)—CH₃ | 7.0 |
| 1-6 | —C(=O)—CH₃ | 8.0 |
| 1-7 | —C(=O)—C₆H₄—CH₃ | 6.1 |
| 1-8 | —C(=O)—C₆H₄—CH₃ | 6.5 |
| 1-9 | —C(=O)—C₆H₄—CH₃ | 6.9 |
| 1-10 | —C(=O)—C₆H₅ | 6.1 |
| 1-11 | —C(=O)—C₆H₅ | 6.5 |

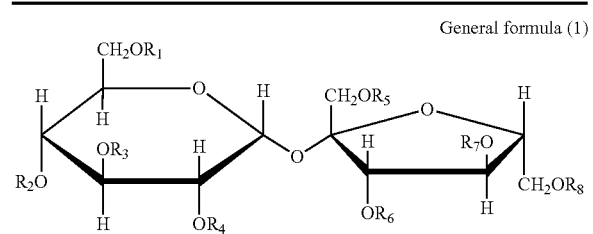

General formula (1)

| COMPOUND No. | $R_1$-$R_8$ | AVERAGE DEGREE OF SUBSTITUTION |
|---|---|---|
| 1-12 | $-\overset{O}{\underset{\|}{C}}-C_6H_5$ | 6.9 |

[Chemical Formula 5]

| 1-13 | $-\overset{O}{\underset{\|}{C}}-CHCH_3\!-\!CH_3$ | 6.1 |
|---|---|---|
| 1-14 | $-\overset{O}{\underset{\|}{C}}-CHCH_3\!-\!CH_3$ | 6.5 |
| 1-15 | $-\overset{O}{\underset{\|}{C}}-CHCH_3\!-\!CH_3$ | 6.9 |
| 1-16 | $-\overset{O}{\underset{\|}{C}}-CH_2-C_6H_5$ | 6.1 |
| 1-17 | $-\overset{O}{\underset{\|}{C}}-CH_2-C_6H_5$ | 6.5 |
| 1-18 | $-\overset{O}{\underset{\|}{C}}-CH_2-C_6H_5$ | 6.9 |
| 1-19 | $-\overset{O}{\underset{\|}{C}}-C_6H_2(OCH_3)_3$ | 6.1 |
| 1-20 | $-\overset{O}{\underset{\|}{C}}-C_6H_2(OCH_3)_3$ | 6.5 |

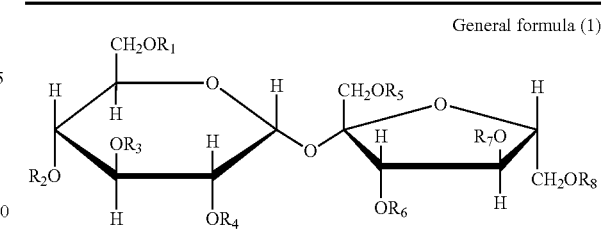

General formula (1)

| COMPOUND No. | $R_1$-$R_8$ | AVERAGE DEGREE OF SUBSTITUTION |
|---|---|---|
| 1-21 | $-\overset{O}{\underset{\|}{C}}-C_6H_2(OCH_3)_3$ | 6.9 |

[Chemical Formula 6]

1-22

$R_4 = -\overset{O}{\underset{\|}{C}}-C_6H_5$

AVERAGE DEGREE OF SUBSTITUTION 5.0

1-23

$R_4 = -\overset{O}{\underset{\|}{C}}-C_6H_5$

AVERAGE DEGREE OF SUBSTITUTION 5.5

[UV Absorber]

The base film also preferably contains an UV absorber. The UV absorber usable herein is exemplified by those of benzotriazole base, 2-hydroxybenzophenone base, and phenyl salicylate base, and more specifically by triazoles such as 2-(5-methyl-2-hydroxyphenyl)benzotriazole, 2-[2-hydroxy-3,5-bis(α,α-dimethylbenzyl)phenyl]-2H-benzotriazole, and 2-(3,5-di-t-butyl-2-hydroxyphenyl)benzotriazole; and benzophenones such as 2-hydroxy-4-methoxybenzophenone, 2-hydroxy-4-octoxybenzophenone, and 2,2'-dihydroxy-4-methoxybenzophenone.

Among the UV absorbers, those having a molecular weight of 400 or larger have high boiling point, less volatile, and less likely to be scattered in the process of forming at high temperatures, and are therefore capable of effectively improving the weather resistance only with a small amount of addition.

The UV absorber having a molecular weight of 400 or larger is exemplified by those of benzotriazole base such as 2-[2-hydroxy-3,5-bis(α,α-dimethylbenzyl)phenyl]-2-benzotriazole, and 2,2-methylenebis[4-(1,1,3,3-tetrabutyl)-6-

(2H-benzotriazole-2-yl)phenol]; those of hindered amine base such as bis(2,2,6,6-tetramethyl-4-piperidyl)sebacate, and bis(1,2,2,6,6-pentamethyl-4-piperidyl)sebacate; and those of hybrid base having in the molecule thereof both of hindered phenol and hindered amine structures, such as bis (1,2,2,6,6-pentamethyl-4-piperidyl) 2-(3,5-di-t-butyl-4-hydroxybenzyl)-2-n-butylmalonate, and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. They may be used alone, or as a mixture of two or more species. Among them, 2-[2-hydroxy-3,5-bis(α,α-dimethylbenzyl)phenyl]-2-benzotriazole and 2,2-methylenebis[4-(1,1,3,3-tetrabutyl)-6-(2H-benzotriazole-2-yl)phenol] are particularly preferable.

They are also commercially available. For example, Tinuvin Series products, such as Tinuvin 109, Tinuvin 171, Tinuvin 234, Tinuvin 326, Tinuvin 327, Tinuvin 328, and Tinuvin 928, all from BASF Japan Ltd., are preferably used.

The base film may further be added with various species of antioxidant, in order to suppress thermal decomposition or thermal coloration in the process of forming. The base film may also be given antistatic property, by adding an antistatic agent.

[Flame Retarder]

The base film may be composed of a flame-retardant acrylic resin composition added with a phosphorus-containing flame retarder. The phosphorus-containing flame retarder usable herein is exemplified by a single species, or mixtures of two or more species selected from red phosphorus, tri-arylphosphoric ester, diarylphosphoric ester, monoarylphosphoric ester, arylphosphonic acid compound, arylphosphine oxide compound, condensed arylphosphoric ester, halogenated alkylphosphoric ester, halogen-containing condensed phosphoric ester, halogen-containing condensed phosphonic ester, and halogen-containing phosphorous ester.

Specific examples include triphenylphosphate, 9,10-dihydro-9-oxa-10-phosphaphenanthrene-10-oxide, phenylphosphonic acid, tris(β-chloroethyl)phosphate, tris(dichloropropyl)phosphate, and tris(tribromoneopentyl)phosphate. The base film is preferably a "film not causative of ductile fracture". The ductile fracture refers to a type of fracture which occurs when a material is applied with stress larger than the strength thereof, and is defined as a fracture accompanied by a distinct elongation or drawing of the material before reaching the final fracture. The fracture surface is characterized by innumerable pits, called dimples, formed thereon.

[Physical Properties of Base Film]

The base film needs be durable for use at possibly high temperatures, and is judged to be heat-durable enough if it has the tensile softening point in the range from 105 to 145° C., and particularly from 110 to 130° C.

In a specific method, the tensile softening point is measured by cutting an optical film in a size of 120 mm (length)× 10 mm (width), pulling the film at a tension of 10 N using a Tensilon tester (RTC-1225A, from Orientec Co., Ltd.), while elevating the temperature at a rate of 30° C./min, measuring three times the temperature at which the tension decreased to 9 N, and finding the average.

The glass transition temperature herein refers to midpoint glass transition temperature (Tmg) which is determined using a differential scanning calorimeter (Model DSC-7, from Perkin Elmer Inc.) at a rate of temperature elevation of 20° C./min., in compliance with JIS K7121 (1987).

The base film, when used as a protective film for polarizing plate of a liquid crystal display apparatus, may degrade the contrast or uniformity in color, due to nonuniformity and change in phase difference ascribable to dimensional changes induced by moisture absorption. The problem will be more noticeable, for the polarizing plate protective film of the liquid crystal display apparatuses for outdoor use. The rate of dimensional change (%) is therefore preferably smaller than 0.5%, and more preferably smaller than 0.3%. The base film preferably has the number of defects, having an in-plane diameter of 5 μm or larger, of less than one per 10-cm square area, more preferably 0.5 per 10-cm square area, and furthermore preferably 0.1 per 10-cm square area. Now for circular defects, the diameter of defect is given by the diameter, whereas for non-circular defects, the diameter is given by the maximum diameter (diameter of a circumscribed circle) of the range of defects observed under a microscope according to the method below. For the defects in the form of bubble or foreign matter, the range of defect is defined by a size of shadow observed by transmitted light under a differential interference microscope. For the defects in the form of modified surface profile caused by transfer of flaw on the roller or scratch, the size of defects is defined by observing the defects by reflected light under a differential interference microscope.

If the size of defects observed by reflective light is unclear, the base film is observed after depositing aluminum or platinum over the surface thereof by vacuum evaporation. In order to obtain the film excellent in quality in terms of such defect density in a highly productive manner, it is effective to subject the polymer solution to micro-filtration, to upgrade cleanliness around the casting machine, or to dry the cast film under stepwise conditions, for efficient drying while suppressing foaming.

If the number of defects is larger than one per 10-cm square area, the film would break as originated from the defects to thereby degrade the productivity, typically when the film is applied with tension during working in the succeeding processes. Meanwhile, if the diameter of defect is 5 μm or larger, the defect is visually observable through a polarizing plate or the like, and would be causative of bright spot when used as an optical component.

Even if not visually observable, the defect would result in uncovered spot (missing of coating) possibly produced when a coating liquid, used for example for forming a hard coat layer over the film, could not be coated uniformly. The defects herein include voids (foaming defect) produced due to abrupt vaporization of the solvent during the drying process in solution casting, and foreign matter in the film (foreign matter defect) ascribable to foreign matter contained in the coating liquid for forming the film, or foreign matter possibly incorporated in the process of film forming.

The base film preferably shows a rupture elongation of 10% or larger at least in one direction, and more preferably 20% or more, when measured in compliance with JIS-K7127-1999.

The upper limit of the rupture elongation is 250% or around in practice, while not specifically limited. For larger rupture elongation, it is effective to suppress defects in the film, ascribable to foreign matters or foaming.

The base film preferably has a thickness of 20 μm or more, and more preferably 30 μm or more.

While not specifically limited, the upper limit of thickness of the film, formed by solution casting, is 250 μm or around in consideration of readiness of coating, foaming, and drying-off of solvent. The thickness of the film is arbitrarily selectable depending on application.

The base film preferably has a total light transmittance of 90% or above, and more preferably 93% or above. The practical upper limit is 99% or around. In order to achieve excellent translucency as represented by such total light transmittance, it is effective to avoid incorporation of any additive or any copolymerizable component which absorbs the visible light, or to remove foreign matters in the polymer by microfiltration to thereby reduce diffusion and absorption of light within the film. It is also effective to reduce surface roughness of portions brought into contact with the film during film forming (cooling roller, calender roller, drum, belt, coating base used in solution casting, feed roller, etc.), to thereby reduce the surface roughness of the film, or to reduce the refractive index of acrylic resin, to thereby reduce diffusion and absorption of light on the surface of the film.

[Manufacture of Base Film]

Next, a method of manufacturing the base film will be explained, without limiting the present invention. Methods usable for manufacturing the base film include inflation process, T-die process, calendering, cutting, casting, emulsion process, and hot pressing.

Both solvent casting and melt casting are acceptable for manufacture of the base film relevant to the present invention.

From the viewpoint of suppressing residence of the solvent used for dissolving the cellulose ester resin and the acrylic resin, the base film is more preferably formed by melt casting. The melt casting is classified into melt extrusion molding, press molding, inflation molding, injection molding, blow molding, and stretching molding. Among them, preferable is the melt extrusion molding capable of yielding a film with excellent mechanical strength and surface accuracy. From the viewpoint of suppressing coloration, suppressing foreign matter defects, and suppressing optical defects such as die line, it is preferable to cast the film by solvent casting.

(Organic Solvent)

Organic solvent useful for forming a dope, which is used when the base film is manufactured by solvent casting, is selectable without limitation from those capable of dissolving acrylic resin, cellulose ester resin and other additives at the same time.

For example, chlorine-containing organic solvent is exemplified by methylene chloride; and chlorine-free organic solvent is exemplified by methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane, wherein methylene chloride, methyl acetate, ethyl acetate, and acetone are preferably used.

The dope preferably contains, besides the organic solvent described above, 1 to 40% by mass of $C_{1-4}$ straight-chain or branched-chain aliphatic alcohol. If the ratio of content of alcohol in the dope becomes high, the web will be gellated, and will therefore become easy to be separated from a metal support, meanwhile if the ratio of content of alcohol becomes low, the acrylic resin and the cellulose ester resin will become more readily soluble in the chlorine-free organic solvent system.

A particularly preferable composition of the dope is such as containing at least 15 to 45% by mass in total of three species, which are acrylic resin, cellulose ester resin and acrylic particle, dissolved in a solvent which contains methylene chloride, and $C_{1-4}$ straight-chain or branched-chain aliphatic alcohol.

The $C_{1-4}$ straight-chain or branched-chain aliphatic alcohol is exemplified by methanol, ethanol, n-propanol, iso-propanol, n-butanol, sec-butanol, and tert-butanol. Among them, ethanol is preferable in view of stability of the dope, relatively low boiling point, and good dryability.

[Solvent Casting]

The base film is manufacturable by solvent casting. The solvent casting is implemented by a step of preparing a dope by dissolving a resin and additive(s) into a solvent, a step of casing the dope onto a belt-shape or drum-shape metal support, a step of drying the cast dope to obtain a web, a step of separating the web from the metal support, a step of stretching or keeping the width, a step of further drying the film, and a step of taking up the resultant film.

The higher the concentration of the cellulose ester and the cellulose ester resin/acrylic resin in the dope, more effectively the load of drying after the casting on the metal support may be reduced. If, however, the concentration of the cellulose ester is too high, the load of filtration will increase, and thereby accuracy of filtration will degrade. The concentration at which these events are balanced is preferably 10 to 35% by mass, and more preferably 15 to 25% by mass. The metal support used in the casting process is preferably mirror-finished, for which a stainless steel belt or a die-cast drum finished by plating is preferably used.

Width of casting may be set to 1 to 4 m. Surface temperature of the metal support in the casting process is set to −50° C. or above and up to a temperature at which the solvent does not boil or foam. While higher temperature is preferable in view of accelerating drying speed of the web, an excessively high temperature may induce foaming of the web or may degrade the surface smoothness.

Preferable temperature of the support is appropriately set in the range from 0 to 100° C., and more preferably from 5 to 30° C. Another preferable method is such as cooling and thereby gellating the web, and then separating the web, while retaining therein much residual solvent, from the drum. Methods of controlling the temperature of the metal support is not specifically limited, and examples of which include a method of blowing hot air or cold air, and a method of bringing warm water into contact with the back surface of the metal support. The method of using warm water is preferred, since the method ensures efficient heat conduction, and shortens the length of time over which the temperature of the metal support becomes constant.

When hot air is used, temperature of the hot air is occasionally set not lower than the boiling point of the solvent, and may be set even higher than a target temperature while suppressing foaming, in consideration of temperature fall of the web due to latent heat of evaporation of the solvent.

It is particularly preferable to efficiently dry the web, by varying the temperature of the support and dry air over the duration from the casting to the separation.

In order to ensure an excellent surface smoothness of the cellulose ester film, the amount of residual solvent in the web, when it is separated from the metal support, is preferably 10 to 150% by mass, more preferably 20 to 40% by mass or 60 to 130% by mass, and particularly 20 to 30% by mass or 70 to 120% by mass.

The amount of residual solvent is given by the equation below.

$$\text{Amount of residual solvent (\% by mass)} = \{(M-N)/N\} \times 100$$

where M represents mass of a sample of the web or film, sampled at an arbitrary point of time during manufacturing or after manufacturing. N represents mass of M heated at 115° C. for 1 hour.

In the drying process of the cellulose ester film or cellulose ester resin-acrylic resin film, the web is separated from the metal support, and further dried until the amount of residual solvent is reduced preferably down to 1% by mass or below, more preferably 0.1% by mass or below, and particularly 0 to 0.01% by mass or below.

In the drying process of the film, the web is generally dried while being conveyed, in a roll drying system (a system of drying which allows the web to alternately pass through a large number of rolls disposed vertically), or a tenter system.

[Stretching Process]

The base film relevant to the present invention preferably has an in-plane retardation Ro (550), measured at 550 nm, in the range from 100 to 160 nm. The retardation is preferably created by stretching of the film.

Methods of stretching are not specifically limited. Examples of the method include a method of longitudinally stretching the web among a plurality of rolls making use of difference in peripheral speeds of the rolls; a method of longitudinally stretching the web while being held at both edges thereof with clips or pins, by expanding the distance between the clips or pins in the direction of travel; a method of transversely stretching the web, in the same way but in the transverse direction; and a method of stretching the web both in the longitudinal and transverse directions, while expanding the web longitudinally and transversely at the same time. Of course these methods may be combined. In other words, the web may be stretched transversely, longitudinally, or in both directions relative to the direction of film making. The stretching in both directions may be implemented simultaneously or sequentially. Note that, in a so-called tenter process, operation of clip portions according to the linear drive system ensures smooth stretching, and is therefore preferable since rupture of the web is avoidable.

In the present invention, the web is preferably stretched in the direction of conveyance making use of difference in the peripheral speeds of the conveying rolls of the film, or in the direction orthogonal to the direction of conveyance (also referred to as widthwise direction or TD) while holding both edges of the web using the clips or the like. It is also preferable to use a tenter capable of varying length of holding (distance between a start point of holding and an end point of holding) of the web, independently by the left and right holding units.

In the present invention, it is also preferable to stretch, in the stretching process, the base film relevant to the present invention in the direction 45° away from the direction of conveyance of the film, in order to adjust the alignment angle θ, relative to the longitudinal direction of the film, to 40 to 50°.

This is because, by means of roll-to-roll bonding of a rolled polarizing film having the slow axis in parallel with the longitudinal direction thereof, and the base film having an alignment angle of substantially 45°, while aligning the longitudinal directions of the two, a rolled web of λ/4 plate may readily be manufactured only with a small loss of cutting, which is advantageous in the production.

(Method of Diagonal Stretching)

A method of stretching in a 45° direction will be explained below.

The λ/4 plate T1 and the λ/4 plate T2 relevant to the present invention are preferably manufactured by diagonal stretching.

A tenter illustrated in FIG. 3 is preferably used for diagonally stretching the cellulose ester film in the direction substantially 45° away from the longitudinal direction. FIG. 3 is a schematic drawing illustrating diagonal stretching using the tenter, and a track of rails of the tenter used for the diagonal stretching.

The stretched film is manufactured using a tenter 4. The tenter 4 is an apparatus configured to widen a film 1, which is fed from a feed roller (unillustrated) over a guide roller at tenter entrance 8-1, in an environment heated by an oven, in a direction diagonal to the film feed direction 7-1 (direction of travel of the middle point of the film). The tenter has the oven, a bilateral pair of rails along which clips (hold units) for conveying the film travel, and a large number of clips (hold units) which travel on the rails. The film, unrolled from the film roll and continuously fed into the entrance portion of the tenter, is held at both ends thereof with the clips (hold units) (film hold start points 2-1, 2-2), guided into the oven, and released from the clips at the exit portion of the tenter. The film (diagonal stretching film 6) released from the clips (hold units) (film hold end points 5-1, 5-2) is conveyed over a guide roller at tenter exit 8-2, and then taken up onto a winding core. A pair of rails respectively have endless loop tracks (tracks of hold units 3-1, 3-2), so as to allow the clips (hold units), after releasing the film at the exit portion of the tenter, to travel outward to be sequentially returned to the entrance portion.

Now the rail geometry of the tenter is bilaterally asymmetrical depending on, for example, the angle of alignment attained in the stretched film to be manufactured, and is finely adjustable manually or automatically. In the present invention, the rails are configured to stretch a long thermoplastic resin film, while arbitrarily setting the angle of alignment θ within the range from 40° to 80° away from the direction of winding the stretched film. In the present invention, the clips of the tenter are allowed to travel at a constant speed while being equally spaced from every adjacent clip.

The factor of stretching R(W/Wo) in the stretching step is preferably 1.3 to 3.0 times, and more preferably 1.5 to 2.8 times. With the factor of stretching adjusted in these ranges, it now becomes possible to suppress variation in thickness in the width-wise direction. In the stretching zone of the tenter, variation in thickness in the width-wise direction may further be improved by making a gradient in the stretching temperature in the width-wise direction. Now Wo represents the width of unstretched film, and W represents the width of stretched film.

The step of diagonal stretching may be implemented in the process of film forming (online), or may be implemented on the tenter after once taking up the film, and then unrolling the film (offline).

The film may be dried generally by means of hot air, infrared radiation, heating roller, microwave or the like, without special limitation, where hot air is preferable for its simplicity.

In the film drying step, the film is preferably dried at (glass transition point −5° C.) or lower, and 100° C. or higher, effectively by annealing for 10 minutes or longer and 60 minutes or shorter. The drying is more preferably conducted at a 100 to 200° C., and furthermore preferably 110 to 160° C.

In order to achieve a good style of the roll, it is preferable, after a predetermined annealing, to trim both ends, by providing a slitter in a preceding stage of winding. Both ends in the width-wise direction are further preferably knurled.

Knurling may be provided by pressing heated embossing rollers. The embossing rollers have a fine irregularity pattern formed thereon, and can transfer the irregularity onto the film when pressed thereto, to thereby make the end portions bulky.

The knurling formed on both ends in the width-wise direction of the cellulose ester film used in the present invention is preferably 4 to 20 μm in height, and 5 to 20 mm in width.

In the present invention, the knurling is provided after completion of the drying in the film forming process, and prior to taking up.

The base films with a function of λ/4 plate relevant to the present invention are preferably manufactured by once making a web based on the same composition of the resin, additives, solvent and so forth composing the film, and then by stretching the web under different conditions so as to vary in-plane retardation value Ro. This contributes to save the manufacturing cost.

[Melt Casting]

The base film may also be manufactured by melt casting. The melt casting is a process of melting under heating a composition which contains a resin and additives such as plasticizer, up to a temperature where the composition fluidizes, and then casting the melt which contains the fluidized cellulose ester.

Forming process based on melting under heating is further classified into melt extrusion molding, press molding, inflation molding, injection molding, blow molding, and stretching molding. Among them, preferable is the melt extrusion molding capable of yielding a film with excellent mechanical strength and surface accuracy. It is generally preferable that plurality of ingredients used for the melt extrusion molding are preliminarily kneaded and pelletized.

Pelletizing may be conducted by any of publicly known methods, typically by feeding dehydrated cellulose ester, plasticizer and other additives using a feeder to a single or twin screw extruder, kneading the ingredients in the extruder, and extruding the ingredients through a die in the form of strand, followed by water cooling or air cooling, and cutting.

The additives may be mixed before being fed to the extruder, or may be fed respectively through independent feeders.

Small amounts of additives, such as particle and antioxidant, are preferably mixed in advance, for uniform mixing.

The pelletizing is preferably proceeded through the extruder under suppressed shearing force, at the lowest possible temperature at which the resin may be pelletized without being degraded (reduction in molecular weight, coloration, gellation, etc.). For an exemplary case of using a twin screw extruder, it is preferable to use deep-channel screws and to rotate them in the same direction. The screws are preferably those of engagement type, in view of uniformity of kneading.

The film is formed by using the thus-manufactured pellet. It is of course possible to directly form the film, without pelletizing, by directly feeding powdery ingredients through the feeder(s) into the extruder.

Using a single screw or twin screw extruder, the pellet before extruded is melted at 200 to 300° C., filtered through a filter of the leaf disk type or the like so as to remove foreign matters, and cast through a T-die to form a film. The film is then nipped between the cooling roller and an elastic touch roller, and then solidified over the cooling roller.

The pellet is preferably fed through a feed hopper to the extruder in vacuo, or under reduced pressure, or in an inert gas atmosphere, so as to prevent oxidative decomposition or the like.

Rate of extrusion is preferably stabilized typically using a gear pump. The filter for removing the foreign matter is preferably a sintered stainless steel fiber filter. The sintered stainless steel fiber filter is a product obtained by compressing a cake of deeply tangled stainless steel fiber, and fusing the contact portions by sintering. The filtration accuracy is adjustable by modifying the density based on thickness of the fiber and the degree of compression.

The additives such as plasticizer and particle may be mixed in advance with the resin, or may be kneaded midway through the process in the extruder. For uniform addition, a mixing device such as static mixer is preferably used.

The temperature of film on the touch roller, when nipped between the cooling roller and the elastic touch roller, is preferably set not lower than Tg of the film, and not higher than Tg+110° C. Any publicly known roller is adoptable to the roller having the elastic surface used for such purpose.

The elastic touch roller is also referred to as compression roller. Any commercially available elastic touch roller is arbitrarily selectable.

When the film is separated from the cooling roller, it is preferable to control the tension so as to prevent the film from being deformed.

The film obtained as described above is stretched by a stretching operation, preferably after a step in which the film is brought into contact with the cooling roller.

The stretching is conducted preferably by using any publicly known roller stretching machine or tenter. The stretching temperature is preferably set, generally in the range from Tg of the resin composing the film, to Tg+60° C.

Before being taken up, the film may be trimmed at both ends to adjust itself to the width of final product, and may be knurled (embossed) on both ends for the purpose of preventing sticking or scratching during taking-up. The knurling may be given by pressing, under heating, metal rings irregularly patterned on the side faces thereof. Both end portions of the film, generally deformed as a result of holding by clips, are not acceptable for use as the product, and are trimmed to be recycled.

[Physical Properties of λ/4 Plate Film]

While not specifically limited, the thickness of the λ/4 plate film in this embodiment is 10 to 200 μm. In particular, the thickness is preferably 10 to 100 μm, and more preferably 20 to 60 μm.

The λ/4 plate film relevant to the present invention is 1 to 4 m wide. In particular, the film is preferably 1.4 to 4 m wide, and particularly 1.6 to 3 m wide. If the width exceeds 4 m, the film becomes hard to be fed.

The λ/4 plate film preferably has an arithmetic average roughness height Ra, specified by JIS B0601 2001, of 1.0 to 4.0 nm, and more preferably 2.0 to 3.0 nm.

[Functional Layer]

The λ/4 plate T1 relevant to the present invention may be provided, as a surface modification layer, with functional layer(s) such as hard coat layer, antiglare hard coat layer, antistatic layer, back coat layer, antireflection layer, smoothening layer, adhesive layer, antiglare layer, and barrier layer.

(Hard Coat Layer, Antiglare Hard Coat Layer)

The λ/4 plate relevant to the present invention may have a hard coat layer provided on the surface thereof. The hard coat layer is preferably either clear hard coat layer or antiglare hard coat layer.

In the embodiment of the present invention, from the viewpoint of developing the effect of the present invention, the hard coat layer is preferably the one formed by using a resin containing an active energy ray-curable resin. The hard coat layer is further preferably formed by using a coating liquid which contains an acrylic acid ester (acrylate) having three or four acryloyl groups.

For the case where the hard coat layer is formed by using the coating liquid, the coating liquid preferably contains less than 10% by mass of solvent. The solvent contained in the coating liquid is preferably ethanol or methanol. The coating liquid also preferably contains neither water nor organic solvent.

The hard coat layer used in the present invention is preferably provided to at least one surface of the λ/4 plate. It is also preferable in the present invention to provide, on the hard coat layer, an antireflection layer which contains at least a low refractive index layer. In particular for on-vehicle navigation system, an antireflection layer is preferably provided on the antiglare hard coat layer for further improved visibility. For the hard coat layer used in the present invention, having fine irregularity formed on the surface thereof to give an antiglare property, such fine irregularity may be formed by adding a fine particle to the hard coat layer, and specifically by adding a fine particle as described below with an average particle size of 0.01 to 4 μm, to the hard coat layer. As described later, the antireflection layer provided on the antiglare hard coat layer preferably has the roughness of topmost surface adjusted in the range from 0.08 to 0.5 μm, in terms of arithmetic average roughness height Ra specified by JIS B0601 2001.

For the clear hard coat layer, the arithmetic average roughness height Ra specified by JIS B0601 2001 is 0.001 to 0.1 μm, and preferably 0.002 to 0.05 μm. The arithmetic average roughness height Ra is preferably measured using an interference surface profiler, for example, WYKO NT-2000 non-contact optical surface profiler from WYKO Corporation.

Particle contained in the antiglare hard coat layer used in the present invention is typically inorganic or organic fine particle.

The inorganic fine particle is exemplified by silicon oxide, titanium oxide, aluminum oxide, tin oxide, zinc oxide, calcium carbonate, barium sulfate, talc, kaolin, and calcium sulfate.

The organic fine particle is exemplified by methyl polymethacrylate/acrylate-based resin fine particle, acrylate/styrene-based resin fine particle, polymethyl methacrylate resin fine particle, silicone-based resin fine particle, polystyrene-based resin fine particle, polycarbonate resin fine particle, benzoguanamine-based resin fine particle, melamine-based resin fine particle, polyolefin-based resin fine particle, polyester-based resin fine particle, polyamide-based resin fine particle, polyimide-based resin fine particle, and polyfluorinated ethylene-based resin fine particle. In the present invention, silicon oxide fine particle and polystyrene-based resin fine particle are particularly preferable.

The inorganic or organic fine particle described above is preferably used by adding it to the coating composition, containing the resin and so forth, used for forming the antiglare hard coat layer.

In order to provide antiglare performance to the antiglare hard coat layer used in the present invention, the content of the inorganic or organic fine particle is preferably 0.1 parts by mass to 30 parts by mass per 100 parts by mass of resin used for manufacturing the antiglare hard coat layer, and more preferably 0.1 parts by mass to 20 parts by mass. For more desirable antiglare performance, it is preferable to add 1 part by mass to 15 parts by mass of a fine particle with an average particle size of 0.1 μm to 1 μm, per 100 parts by mass of resin used for manufacturing the antiglare hard coat layer. It is also preferable to use two or more species of fine particles having different average diameters.

The antiglare hard coat layer used in the present invention is also preferably added with a antistatic agent. The antistatic agent is preferably an electro-conductive material which contains, as a main ingredient, at least one element selected from the group consisting of Sn, Ti, In, Al, Zn, Si, Mg, Ba, Mo, W and V, and has a volume resistivity of $10^7$ Ω·cm or smaller.

The antistatic agent is exemplified by metal oxide and composite oxide which contain the element(s) described above.

Preferable examples of the metal oxide include ZnO, $TiO_2$, $SnO_2$, $Al_2O_3$, $In_2O_3$, $SiO_2$, MgO, BaO, $MoO_2$, $V_2O_5$, and composite oxide of them. ZnO, $In_2O_3$, $TiO_2$ and $SnO_2$ are particularly preferable. In exemplary cases containing dopant atom(s), it is effective to add Al, In or the like to ZnO, to add Nb, Ta or the like to $TiO_2$, and to add Sb, Nb, halogen atom or the like to $SnO_2$. Amount of addition of these dopant atoms is preferably 0.01 to 25 mol%, and particularly 0.1 to 15 mol%.

The volume resistivity of these electro-conductive metal oxide powders is $10^7$ Ω·cm or smaller, and particularly $10^5$ Ω·cm or smaller.

From the viewpoint of providing sufficient levels of durability and impact resistance, the clear hard coat layer or antiglare hard coat layer preferably has a thickness of 0.5 to 15 μm, and more preferably 1.0 to 7 μm.

(Active Energy Ray-Curable Resin)

The hard coat layer used in the present invention preferably contains an active energy ray-curable resin which is curable when irradiated with active energy ray such as ultraviolet radiation.

The active energy ray-curable resin refers to a resin which cures by crosslinking reaction or the like upon irradiated by active energy ray such as ultraviolet radiation or electron beam. The active energy ray-curable resin is represented by UV-curable resin and electron beam-curable resin, and also by resins curable by active energy ray other than UV and electron beam.

The UV-curable resin is exemplified by UV-curable acrylic urethane-based resin, UV-curable polyester acrylate-based resin, UV-curable epoxy acrylate-based resin, UV-curable polyol acrylate-based resin, and UV-curable epoxy resin.

The UV-curable acrylic urethane-based resin is readily obtained, generally by allowing polyester polyol to react with an isocyanate monomer or prepolymer, and further allowing the product to react with an acrylate-based monomer having a hydroxy group such as 2-hydroxyethyl acrylate, 2-hydroxyethyl methacrylate (simple notification of "acrylate" hereinafter used to include methacrylate), or 2-hydroxypropyl acrylate. For example, a mixture of 100 parts of Unidic 17-806 (from DIC Corporation) and 1 part of Coronate L (from Nippon Polyurethane Industry Co., Ltd.), described in JP-A-S59-151110, is preferably used.

The UV-curable polyester acrylate-based resin is readily obtained, generally by allowing a hydroxy group or a carboxy group at the terminal of polyester to react with a monomer such as 2-hydroxyethyl acrylate, glycidyl acrylate or acrylic acid (see JP-A-S59-151112, for example).

The UV-curable epoxy acrylate-based resin is obtained by allowing a hydroxy group at the terminal of epoxy resin, to react with a monomer such as acrylic acid, acryloyl chloride or glycidyl acrylate.

The UV-curable polyol acrylate-based resin is exemplified by ethylene glycol (meth)acrylate, polyethylene glycol di(meth)acrylate, glycerin tri(meth)acrylate, trimethylolpropane triacrylate, pentaerythritol triacrylate, pentaerythritol tetra acrylate, dipentaerythritol pentaacrylate, dipentaerythritol hexaacrylate, and alkyl-modified dipentaerythritol penta acrylate.

Examples of epoxy-based compound reactive to active energy ray, which are advantageously used as the UV-curable epoxy acrylate-based resin and the UV-curable epoxy resin, will be listed below:

(a) glycidyl ether of bisphenol A (obtained as a mixture of components with different degrees of polymerization, by a reaction between epichlorohydrin and bisphenol A);

(b) compound having a glycidyl ether group at the terminal, obtained by allowing a compound having two phenolic OH groups, such as bisphenol A, to react with epichlorohydrin, ethylene oxide and/or propylene oxide;

(c) glycidyl ether of 4,4'-methylenebisphenol;

(d) epoxy compound of phenol formaldehyde resin such as novolac resin and resol resin;

(e) compound having alicyclic epoxide, for example,
bis(3,4-epoxycyclohexylmethyl)oxalate,
bis(3,4-epoxycyclohexylmethyl)adipate,
bis(3,4-epoxy-6-cyclohexylmethyl)adipate,
bis(3,4-epoxycyclohexylmethyl)pimelate,
3,4-epoxycyclohexylmethyl-3,4-epoxycyclohexane carboxylate,
3,4-epoxy-1-methylcyclohexylmethyl-3',4'-epoxycyclohexane carboxylate,
3,4-epoxy-1-methyl-cyclohexylmethyl-3',4'-epoxy-1'-methylcyclohexane carboxylate,
3,4-epoxy-6-methyl-cyclohexylmethyl-3',4'-epoxy-6'-methyl-1'-cyclohexane carboxylate, and
2-(3,4-epoxycyclohexyl-5',5'-spiro-3",4"-epoxy)cyclohexane-meta-dioxane;

(f) diglycidyl ether of dibasic acid, for example, diglycidyl oxalate, diglycidyl adipate, diglycidyl tetrahydrophthalate, diglycidyl hexahydrophthalate, and diglycidyl phthalate;

(g) diglycidyl ether of glycol, for example, ethylene glycol diglycidyl ether, diethylene glycol diglycidyl ether, propylene glycol diglycidyl ether, polyethylene glycol diglycidyl ether, polypropylene glycol diglycidyl ether, copoly(ethylene glycol-propylene glycol) diglycidyl ether, 1,4-butanediol diglycidyl ether, and 1,6-hexanediol diglycidyl ether;

(h) glycidyl ester of polymer acid, for example, polyglycidyl ester of polyacrylic acid, and diglycidyl ester of polyester;

(i) glycidyl ether of polyhydric alcohol, for example, glycerin triglycidyl ether, trimethylolpropane triglycidyl ether, pentaerythritol diglycidyl ether, pentaerythritol triglycidyl ether, pentaerythritol tetraglycidyl ether, and glucose triglycidyl ether;

(j) diglycidyl ether of 2-fluoroalkyl-1,2-diol, similar to the compounds exemplified above as the fluorine-containing epoxy compound which is fluorine-containing resin with low refractive index; and (k) diolglycidyl ether with fluorine-containing alkane terminal, exemplified above by the fluorine-containing epoxy compound which is fluorine-containing resin with low refractive index.

The epoxy compound has a molecular weight of 2000 or smaller in terms of average molecular weight, and preferably 1000 or smaller.

The epoxy compound, intended to be cured by active energy ray, is advantageously used by mixing it with the polyfunctional epoxy group-containing compound (h) or (i), for increased hardness.

Photo-polymerization initiator or photo-sensitizer, which assists cation polymerization of the epoxy-based compound reactive to active energy ray, is a compound capable of releasing a cation polymerization initiating substance upon irradiation by active energy ray, and is particularly any of a group of double salts of onium salts which releases, upon irradiation, a Lewis acid capable of initiating the cation polymerization.

The epoxy resin reactive to active energy ray is allowed to polymerize by cation polymerization, rather than radical polymerization, to form a crosslinked structure or a network structure. Such resin reactive to active energy ray is preferable since it is not affected by oxygen in the reaction system, unlike radical polymerization.

The epoxy resin reactive to active energy ray, useful in the present invention, is allowed to polymerize with the aid of a photo-polymerization initiator or a photo-sensitizer which releases, upon irradiation by active energy ray, a substance capable of initiating the cation polymerization. As the photo-polymerization initiator, a group of double salts of onium salts which release, upon irradiation of light, Lewis acids capable of initiating the cation polymerization are particularly preferable.

Representative compounds are represented by the formula (a) below:

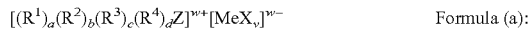

$$[(R^1)_a(R^2)_b(R^3)_c(R^4)_dZ]^{w+}[MeX_v]^{w-} \quad \text{Formula (a):}$$

In the formula, the cation is an onium, Z represents S, Se, Te, P, As, Sb, Bi, O, halogen (for example, I, Br, Cl), or N≡N (diazo), and $R^1$, $R^2$, $R^3$ and $R^4$ represent organic groups which may be same or different. Each of a, b, c and d represents an integer of 0 to 3, where a+b+c+d equals to the valence of Z. Me represents a metal or metalloid which configures the central atom of the halogenated complex such as B, P, As, Sb, Fe, Sn, Bi, Al, Ca, In, Ti, Zn, Sc, V, Cr, Mn, Co or the like. X represents a halogen, w represents a net electric charge of the halogenated complex ion, and v represents the number of halogen atoms in the halogenated complex ion.

The anion $[MeX_v]^{w-}$ in the formula (a) above is exemplified by tetrafluoroborate ($BF_4^-$), tetrafluoro phosphate ($PF_4^-$), tetrafluoroantimonate ($SbF_4^-$), tetrafluoroarsenate ($AsF_4^-$), and tetrachloroantimonate ($SbCl_4^-$) ions.

Other anions are exemplified by perchlorate ion ($ClO_4^-$), trifluoromethanesulfonate ion ($CF_3SO_3^-$), fluorosulfonate ion ($FSO_3^-$), toluenesulfonate ion, and trinitrobenzoic acid anion.

Among these onium salts, aromatic onium salts are effectively used as the cation polymerization initiator. Particularly preferable are aromatic halonium salt described in JP-A-S50-151996, ibid. 50-158680 and so forth; Group VIa aromatic onium salt described in JP-A-S50-151997, ibid. 52-30899, ibid. 59-55420, ibid. 55-125105 and so forth; oxosulfoxonium salt described in JP-A-S56-8428, ibid. 56-149402, ibid. 57-192429 and so forth; aromatic diazonium salt described in JP-B-S49-17040 and so forth; and thiopyrylium salt described in U.S. Pat. No. 4,139,655. Also exemplified are aluminum complex, and photo-degradable silicon compound-based polymerization initiator. The cation polymerization initiator may be used in combination with a photo-sensitizer such as benzophenone, benzoin isopropyl ether or thioxanthone.

For the compound reactive to active energy ray, having epoxy acrylate group, a photo-sensitizer such as n-butylamine, triethyl amine, or tri-n-butylphosphine may be used. An amount of 0.1 to 15 parts by mass of the photo-sensitizer or the photo-initiator, per 100 parts by mass of UV reactive compound, is enough to initiate the photo-reaction. The amount is preferably 1 to 10 parts by mass. The sensitizer preferably has an absorption maximum in the range from near-UV region to the visible light region.

In the active energy ray-curable resin composition useful in the present invention, amount of use of the polymerization initiator is preferably 0.1 to 15 parts by mass per 100 parts by mass of the active energy ray-curable epoxy resin (prepolymer) in general, and more preferably 1 to 10 parts by mass.

The epoxy resin may also be used in combination with the urethane acrylate-type resin, polyether acrylate-type resin, or the like. In this case, an radical polymerization initiator reactive to active energy ray and a cation polymerization initiator reactive to active energy ray are preferably combined.

For the hard coat layer used in the present invention, still also an oxetane compound is usable. The oxetane compound usable herein includes compounds having a three-membered oxetane ring containing oxygen or sulfur. Among them, a compound having an oxygen-containing oxetane ring is preferable. The oxetane ring may be substituted by halogen atom, haloalkyl group, arylalkyl group, alkoxy group, aryloxy group, or acetoxy group. Specific examples include 3,3-bis(chloromethyl)oxetane, 3,3-bis(iodomethyl)oxetane, 3,3-bis(methoxymethyl)oxetane, 3,3-bis(phenoxymethyl)oxetane, 3-methyl-3-chloromethyloxetane, 3,3-bis(acetoxymethyl)oxetane, 3,3-bis(fluoromethyl)oxetane, 3,3-bis(bromomethyl)oxetane, and 3,3-dimethyloxetane. In the present invention, the oxetane compound may be any of monomer, oligomer and polymer.

In the embodiment of the present invention, from the viewpoint of developing the effect of the present invention, the hard coat layer is preferably formed using a resin which contains an active energy ray-curable resin. The hard coat layer is more preferably formed by using a coating liquid which contains an acrylic acid ester (acrylate) having 3 or 4 acryloyl groups.

For the hard coat layer used in the present invention, which contains the active energy ray-curable resin, while the active energy ray might be irradiated after the antiglare hard coat layer, antireflection layer (middle-to-high refractive index layer and low refractive index layer) and so forth are formed by coating on the support, it is preferable to irradiate the active energy ray when the hard coat layer is formed by coating.

The active energy ray used in the present invention is selectable without limitation from energy sources capable of activating the compound, such as ultraviolet radiation, electron beam, and γ-ray, wherein ultraviolet radiation and electron beam are preferable and ultraviolet radiation is particularly preferable for its easy handling and easy accessibility to high energy. Light sources used for photo-polymerization of the UV-reactive compound are arbitrarily selectable from those capable of generating ultraviolet radiation. Examples include low-pressure mercury lamp, middle-pressure mercury lamp, high-pressure mercury lamp, ultrahigh-pressure mercury lamp, carbon arc lamp, metal halide lamp, and xenon lamp. Also usable are ArF excimer laser, KrF excimer laser, excimer lamp and synchrotron radiation light. Conditions of irradiation vary depending on the individual lamps, where radiation dose is preferably 20 mJ/cm² or larger, more preferably 50 to 10000 mJ/cm², and particularly 50 to 2000 mJ/cm².

Ultraviolet irradiation may be given every time the hard coat layer, or each of the plurality of layers (middle refractive index layer, high refractive index layer, low refractive index layer) composing the antireflection layer described later is formed, or may be irradiated after the layers are stacked. Alternatively, these modes of irradiation may be combined. From the viewpoint of productivity, the ultraviolet irradiation is preferably given after stacking the multi-layer.

Also electron beam may be used in the same way. The electron beam may be emitted from various types of electron beam accelerator including those of Cockcroft-Walton type, Van de Graaff type, resonance transformer type, insulated core transformer type, linear type, dynamitron type, and high frequency type, with an energy of 50 to 1000 keV, and preferably 100 to 300 keV.

While the photo-polymerization or photo-crosslinking reaction of the active energy ray-reactive compound used in the present invention may be initiated alone by the active energy ray-reactive compound, an induction period of polymerization may sometimes be long, or start of polymerization sometimes delays. It is therefore preferable to use the photo-sensitizer or photo-initiator, so as to accelerate the polymerization.

For the hard coat layer used in the present invention, which contains the active energy ray-curable resin, the photo-reaction initiator or the photo-sensitizer may be used in the process of irradiation of active energy ray.

Specific examples include acetophenone, benzophenone, hydroxybenzophenone, Michler's ketone, α-amiloxim ester, thioxanthone, and derivatives of them. In the process of synthesizing the epoxy acrylate-based resin using the photo-reactive agent, a sensitizer such as n-butylamine, triethylamine, or tri-n-butylphosphine may be used. The amount of use of the photo-reaction initiator and/or photo-sensitizer contained in the UV-curable resin composition, excluding the solvent component which vaporizes off during coating and drying, is preferably 1 to 10% by mass of the composition, and particularly 2.5 to 6% by mass.

When the UV-curable resin is used as the active energy ray-curable resin, a UV absorber described later may be included in the UV-curable resin composition, to a degree that the photo-curing of the UV-curable resin will not be inhibited.

For the purpose of improving the heat resistance of the hard coat layer, an antioxidant which will not suppress the photo-curing reaction may be selected and used. Examples include hindered phenol derivative, thiopropionic acid derivative, and phosphite derivative. Specific examples include 4,4'-thiobis(6-tert-3-methylphenol), 4,4'-butylidenebis(6-tert-butyl-3-methylphenol), 1,3,5-tris(3,5-di-tert-butyl-4-hydroxybenzyl)isocyanurate, 2,4,6-tris(3,5-di-tert-butyl-4-hydroxybenzyl)mesitylene, and di-octadecyl-4-hydroxy-3,5-di-tert-butylbenzylphosphate.

The UV-curable resin is arbitrarily selectable from commercially available products such as Adekaoptomer KR and BY Series including KR-400, KR-410, KR-550, KR-566, KR-567 and BY-320B (all from ADEKA Corporation); Koeihard Series including A-101-KK, A-101-WS, C-302, C-401-N, C-501, M-101, M-102, T-102, D-102, NS-101, FT-102Q8, MAG-1-P20, AG-106 and M-101-C (all from Koei Chemical Co., Ltd.); Seikabeam Series including PHC2210(S), PHCX-9(K-3), PHC2213, DP-10, DP-20, DP-30, P1000, P1100, P1200, P1300, P1400, P1500, P1600 and SCR900 (all from Dainichiseika Color and Chemicals Mfg. Co., Ltd.); KRM7033, KRM7039, KRM7130, KRM7131, UVE-CRYL29201 and UVECRYL29202 (all from Daicel-UCB Co., Ltd.); RC-5015, RC-5016, RC-5020, RC-5031, RC-5100, RC-5102, RC-5120, RC-5122, RC-5152, RC-5171, RC-5180 and RC-5181 (all from DIC Corporation); Aurex No. 340 Clear (from Chugoku Marine Paints, Ltd.); Sanrad H-601(from Sanyo Chemical Industries, Ltd.); SP-1509 and SP-1507 (from Showa Highpolymer Co., Ltd.); RCC-15C (from Grace Japan Co., Ltd.); Aronix M-6100, M-8030, M-8060 (all from Toagosei Co., Ltd.); and other commercialized products.

Coating composition containing the active energy ray-curable resin preferably has a solid concentration of 10 to 95% by mass, which is properly selected depending on methods of coating.

The hard coat layer and the antireflection layer used in the present invention also preferably contain a surfactant. The surfactant is preferably a silicone-based or fluorine-containing surfactant.

The silicone-based surfactant is preferably nonionic surfactant having the hydrophobic group configured by dimethylpolysiloxane, and the hydrophilic group configured by polyoxyalkylene.

The nonionic surfactant, the name of which is general for surfactants having no group ionizable in aqueous solution, has hydrophobic group, and also hydrophilic group such as hydroxy groups of polyhydric alcohols, or polyoxyalkylene chain (polyoxyethylene). Hydrophilicity increases as the number of alcoholic hydroxy groups increases, or as the polyoxyalkylene chain (polyoxyethylene chain) becomes longer. The nonionic surfactant relevant to the present invention characteristically has dimethylpolysiloxane as the hydrophobic group.

By using the nonionic surfactant having the hydrophobic group configured by dimethylpolysiloxane, and having the hydrophilic group configured by polyoxyalkylene, then the antiglare hard coat layer and the low refractive index layer are improved in nonuniformity, and antifouling property of the film surface. The hydrophobic groups of polymethylsiloxane are supposed to orient towards the surface, to thereby make the film surface less likely to be fouled. This is an effect not obtainable by using other surfactants.

Specific examples of the nonionic surfactant include silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191, from NUC Corporation.

Also exemplified are SUPERSILWET SS-2801, SS-2802, SS-2803, SS-2804 and SS-2805.

The nonionic surfactant, having the hydrophobic group configured by dimethylpolysiloxane, and having the hydrophilic group configured by polyoxyalkylene, preferably has a structure in which a dimethylpolysiloxane structural moiety and a polyoxyalkylene chain alternately and repetitively combined to form a straight-chain block copolymer. This is excellent by virtue of its long principal chain skeleton and straight-chain structure. Since the block copolymer has the hydrophilic groups and the hydrophobic groups alternately combined therein, so that a single surfactant molecule can supposedly adhere to the surface of the fine silica particle so as to cover it at a plurality of sites.

Specific examples of them include silicone surfactants ABN SILWET FZ-2203, FZ-2207 and FZ-2208 from NUC Corporation.

The fluorine-containing surfactant usable herein is a surfactant having the hydrophobic group configured by a perfluorocarbon chain. Examples include fluoroalkylcarboxylic acid, disodium N-perfluorooctanesulfonyl glutamate, sodium 3-(fluoroalkyloxy)-1-alkyl sulfonate, sodium 3-(ω-fluoroalkanoyl-N-ethylamino)-1-propane sulfonate, N-(3-perfluorooctanesulfonamide)propyl-N,N-dimethyl-N-carboxymethyleneammonium betaine, perfluoroalkylcarboxylic acid, perfluorooctanesulfonic acid diethanolamide, perfluoroalkylsulfonate salt, N-propyl-N-(2-hydroxyethyl)perfluorooctanesulfonamide, perfluoroalkylsulfonamide propyltrimethylammonium salt, perfluoroalkyl-N-ethylsulfonylglycine salt, and bis(N-perfluorooctylsulfonyl-N-ethylaminoethyl)phosphate. The nonionic surfactant is preferable in the present invention.

These fluorine-containing surfactants are commercially available under the trade names of Megafac, Eftop, Surflon, Ftergent, Unidyne, Fluorad, Zonyl and so forth.

The amount of addition is 0.01 to 3.0% of the solid content of the coating liquids for forming the hard coat layer and the antireflection layer, and more preferably 0.02 to 1.0%.

Also other surfactants may optionally be used in combination, which are exemplified by anionic surfactants which include those of sulfonate salt-based, sulfate ester salt-based, phosphate ester salt-based; and nonionic surfactants which include those of ether type, ether ester type and so forth, having a polyoxyethylene chain as the hydrophilic group.

Solvent used for forming, by coating, the hard coat layer in the present invention is selectable from a variety of solvents having conventionally been used for forming, by coating, the hard coat layer. In the present invention, ethanol or methanol is particularly preferable as a solvent.

Amount of solvent is preferably less than 10% by mass, and more preferably 5 to 8% by mass. It is alternatively preferable to use no solvent, that is, to use a non-solvent system.

If a monomer having five or more acryloyl groups is used for the hard coat layer, the diagonally stretched λ/4 plate (phase difference film) will show streaks on the surface thereof in a more emphasized manner. If a nonpolar solvent such as acetone, PGME (propylene glycol monomethyl ether) or ethyl acetate is used, diagonal residual stress which remains in the diagonally stretched λ/4 plate (phase difference film) will be emphasized, and thereby streaks are induced on the film surface. If a monomer having five or more acrylic groups, or the nonpolar solvent described above is used, a film provided with the hard coat layer will show, in wet heat durability test, variation (maximum value−minimum value) of in-plane phase difference Ro will exceed 10 nm in the width-wise direction. The thus-manufactured film, when incorporated into a display apparatus, will considerably degrade the display quality.

Coating liquid of hard coat layer-forming composition may be coated by any of publicly known methods including those using gravure coater, spinner coater, wire bar coater, roll coater, reverse coater, extrusion coater or air doctor coater, or by spray coating or ink jet coating. A proper amount of coating is 5 to 30 μm in terms of wet film thickness, and is preferably 10 to 20 μm. Speed of coating is preferably 10 to 200 m/min.

The hard coat layer composition, after coated and dried, is preferably cured, wherein the irradiation time of active energy ray is preferably 0.5 seconds to 5 minutes, and more preferably 3 seconds to 2 minutes from the viewpoint of curing efficiency of the UV-curable resin and work efficiency.

(Back Coat Layer)

The λ/4 plate relevant to the present invention may be provided with a back coat layer on the surface of the base film opposite to the side thereof where the antiglare layer is provided, in order to prevent curling, or sticking of the film when stored in the form of roll.

For this purpose, the back coat layer preferably contains a fine particle. The fine particle is exemplified by those composed of silicon dioxide, titanium dioxide, aluminum oxide, zirconium oxide, calcium carbonate, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. For the purpose of dispersing the fine particle, and of preparing a coating composition by dissolving therein a binder described later, the coating composition preferably contains a solvent. The solvent is preferably any of those explained above in relation to the functional layer. Content of the particle in the back coat layer is preferably 0.1 to 50% by mass of the binder. Increase in haze as a result of providing the back coat layer is 1.5% or smaller, and preferably 0.5% or smaller. The binder preferably used herein is cellulose ester resins such as diacetyl cellulose.

(Antireflection Layer)

The λ/4 plate relevant to the present invention may have the antireflection layer coated on the antiglare layer, so as to be used as an antireflection film which functions to prevent external light reflection.

The antireflection layer is preferably stacked taking the refractive index, the thickness, the number of layers and the order of stacking of the layers into consideration, so as to reduce the reflectivity as a result of optical interference. The antireflection layer is preferably configured by a low refractive index layer having a refractive index smaller than that of the support, or by a combination of a high refractive index layer having a refractive index larger than that of the support and the low refractive index layer. The antireflection layer configured by three or more refractive index layers is particularly preferable, wherein a preferable order of stacking of three layers with different refractive indices, as viewed from the support side, is given by middle refractive index layer (layer having a refractive index larger than that of the support and smaller than that of the high refractive index layer)/high refractive index layer/low refractive index layer. Alternatively, also preferably used is the antireflection layer configured by four or more layers, in which two or more high refractive index layers and two or more low refractive index layers are alternately stacked. Possible layer configurations of the antireflection film are listed below, without being limited thereto.

Base film/antiglare layer/low refractive index layer;
Base film/antiglare layer/middle refractive index layer/low refractive index layer;
Base film/antiglare layer/middle refractive index layer/high refractive index layer/low refractive index layer; and
Base film/antiglare layer/high refractive index layer (electroconductive layer)/low refractive index layer.

(Low Refractive Index Layer)

The low refractive index layer which is essential to the antireflection film preferably contains a silica-based fine particle, and preferably has a refractive index in the range from 1.30 to 1.45, which is smaller than that of the base film for configuring the support, when measured at 23° C. and at a wavelength of 550 nm.

The low refractive index layer is preferably 5 nm to 0.5 μm thick, more preferably 10 nm to 0.3 μm thick, and most preferably 30 nm to 0.2 μm thick.

The composition for forming the low refractive index layer preferably contains at least one species of silica-based fine particle, particularly such as having a shell layer and a porous or hollow core. In particular, the particle with the shell, and the porous or hollow core is preferably a hollow silica-based fine particle.

The composition for forming the low refractive index layer may contain an organic silicon compound represented by the formula (OSi-1) below, hydrolysate thereof, or polycondensate thereof in combination.

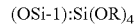

(OSi-1):Si(OR)$_4$   Formula

In the formula representing the organic silicon compound, R represents a $C_{1-4}$ alkyl group. More specifically, tetramethoxysilane, tetraethoxysilane, tetraisopropoxysilane and so forth are preferably used.

In addition, solvent, and if necessary, silane coupling agent, curing agent, surfactant and so forth may be added.

(High Refractive Index Layer)

The refractive index of the high refractive index layer is preferably adjusted to the range from 1.4 to 2.2 when measured at 23° C. and at a wavelength of 550 nm. The high refractive index layer is preferably 5 nm to 1 μm thick, more preferably 10 nm to 0.2 μm thick, and most preferably 30 nm to 0.1 μm thick. The refractive index is adjustable by adding a metal oxide fine particle or the like. The metal oxide, or the metal oxide fine particle used herein preferably has a refractive index of 1.80 to 2.60, and more preferably 1.85 to 2.50.

Species of the metal oxide fine particle is not specifically limited, wherein the metal oxide contains at least one element selected from Ti, Zr, Sn, Sb, Cu, Fe, Mn, Pb, Cd, As, Cr, Hg, Zn, Al, Mg, Si, P and S. These metal oxide fine particles may be doped with a trace amount of Al, In, Sn, Sb, Nb, halogen element, or Ta, and also may be any mixture of them. In the present invention, it is particularly preferable to use, as a main component, at least one species of metal oxide fine particle selected from those of zirconium oxide, antimony oxide, tin oxide, zinc oxide, indium tin oxide (ITO), antimony doped tin oxide (ATO), and zinc antimonate fine particle. In particular, zinc antimonate particle is preferably contained.

These metal oxide fine particles have an average particle size of primary particle of 10 to 200 nm, and particularly 10 to 150 nm. The average particle size of the metal oxide fine particle is determined from electron microphotograph taken under a scanning electron microscope (SEM) or the like. The average particle size may alternatively be measured using a particle size analyzer based on dynamic light scattering or static light scattering. If the particle size is too small, the particles will tend to coagulate, and will degrade the dispersibility. If the particle size is too large, the haze will considerably increase, which is undesirable. Geometry of the metal oxide fine particle is preferably rice grain-like, spherical, cubic, fusiform, needle like, or irregular.

The metal oxide fine particle may be treated on the surface thereof with an organic compound. By modifying the surface of the metal oxide fine particle with the organic compound, the oxide fine particle will be improved in the dispersion stability in the organic solvent, will more readily be controlled in the size of dispersed particle, and will also be suppressed from aggregating and precipitating with time. Accordingly, the amount of surface modification with the organic compound is preferably 0.1 to 5% by mass of the metal oxide particle, and more preferably 0.5 to 3% by mass. Examples of the organic compound used for the surface modification include polyol, alkanolamine, stearic acid, silane coupling agent and titanate coupling agent. Among them, silane coupling agent is preferable. Two or more processes of surface treatment may be combined. The high refractive index layer may contain a π-conjugated conductive polymer. The π-conjugated conductive polymer usable herein is any of organic polymers having the principal chain thereof composed of a π-conjugation system, which is exemplified by polythiophenes, polypyrrols, polyanilines, polyphenylenes, polyacetylenes, polyphenylene vinylenes, polyacenes, polythiophene vinylenes, and copolymers of them. From the viewpoints of easy polymerization and stability, polythiophenes, polyanilines, and polyacetylenes are preferable.

While the π-conjugated conductive polymer, even in its unsubstituted form, gives sufficient levels of electro-conductivity and solubility into the binder resin, it may additionally be introduced with a functional group such as alkyl group, carboxy group, sulfo group, alkoxy group, hydroxy group, or cyano group, for further improved electro-conductivity and solubility.

The layer may also contain an ionic compound. The ionic compound is exemplified by compounds composed of cations of imidazolium base, pyridium base, alicyclic amine base, aliphatic amine base, or aliphatic phosphonium base, and anions such as inorganic ions including $BF_4^-$, $PF_6^-$ and so forth, or fluorine-containing anions including $CF_3SO_2^-$, $(CF_3SO_2)_2N^-$, $CF_3CO_2^-$ and so forth. As for the ratio of the polymer and the binder, 10 to 400 parts by mass of the binder is preferably contained per 100 parts by mass of the polymer, and particularly, 100 to 200 parts by mass of the binder is preferably contained per 100 parts by mass of the polymer.

[Method of Manufacturing Circularly Polarizing Plate]

The circularly polarizing plate of the present invention, using the λ/4 plate relevant to the present invention, will be explained. The circularly polarizing plate may be manufactured by any of general methods. It is preferable that the λ/4 plate relevant to the present invention is alkali-saponified on the back surface thereof, and the thus treated λ/4 plate (film) is bonded to at least one surface of the polarizing film manufactured by immersion into an iodine solution and by stretching, using an aqueous solution of fully-saponified polyvinyl alcohol.

On the other surface, the film T2 having the λ/4 plate function relevant to the present invention may be provided. In contrast to the film relevant to the present invention, the polarizing plate protective film used for the other surface is preferably configured by a cellulose triacetate film, which is the base film described above, and a protective film having a ratio of contents by mass of the acrylic resin and the cellulose ester resin given by (acrylic resin):(cellulose ester resin)=95:5 to 50:50. Details of the configuration are as mentioned above. One specific example relates to a non-oriented film with a retardation value Ro at 590 nm of 0 to 5 nm, and Rt of −20 to +20 nm.

Also commercially available polarizing plate protective films are preferably used, which are exemplified by KC8UX2MW, KC4UX, KC5UX, KC4UY, KC8UY, KC12UR, KC4UEW, KC8UCR-3, KC8UCR-4, KC8UCR-5, KC4FR-1, KC4FR-2, KC8UE and KC4UE (from Konica Minolta Opto, Inc.).

The polarizing film (also referred to as polarizer), which is a main constituent of the polarizing plate, is an element which allows only light having a plane of polarization of a certain directionality to pass therethrough. One representative polarizing film ever known is a polyvinyl alcohol-based polarizing film, which is manufactured by dying the polyvinyl alcohol-based film with iodine or dichroic dye, but not limited thereto. The polarizing film having been used is obtained by casting an aqueous polyvinyl alcohol solution, followed successively by uniaxial stretching and dying, or successively by dying and uniaxial stretching, and then preferably by toughening with a boron compound. The polarizing film is 5 to 30 μm thick, and preferably 8 to 15 μm thick.

The polarizing plate is formed by bonding, on the surface of the polarizing film, one surface of the λ/4 plate relevant to the present invention. In the bonding, a water-based adhesive, which contains a fully-saponified polyvinyl alcohol or the like, is preferably used.

(Adhesive Layer)

The adhesive layer (also referred to as adhesion layer) used on one surface of the protective film, for bonding to the organic EL display panel, is not only optically translucent, but also preferably has an appropriate level of visco-elasticity or tackiness.

The adhesive layer is specifically formed typically by using an adhesive polymer or tacky agent polymer such as acrylic copolymer, epoxy-based resin, polyurethane, silicone-based polymer, polyether, butyral-based resin, polyamide-based resin, polyvinyl alcohol-based resin, and synthetic rubber, and by allowing the polymer to form a film and to cure, typically by drying, chemical curing, heat curing, thermal melting, or photo-curing. Among them, acrylic copolymer is preferably used, by virtue of its best controllability in tackiness and excellence in translucency, weather resistance and durability.

[Stereoscopic Image Display Apparatus]

The circularly polarizing plate of the present invention is usable in various embodiments of stereoscopic image display apparatus. For example, it is usable for the stereoscopic image display apparatus which is composed of an image display apparatus and liquid crystal shutter spectacles, wherein the liquid crystal shutter spectacles are those having a (1) λ/4 plate, a liquid crystal cell, and a polarizer provided in this order, or a (2) λ/4 plate, a polarizer, a liquid crystal cell, and a polarizer provided in this order.

In either embodiment, the circularly polarizing plate on the front side (viewer's side) of the image display apparatus is configured by a λ/4 plate (λ/4 film T1 relevant to the present invention), a polarizer, and an optical film cell (λ/4 film T2) provided in this order.

[Organic Electroluminescence Image Display Apparatus (Organic EL Image Display Apparatus)]

An organic EL image display apparatus is generally configured as illustrated in FIG. 1, wherein on a translucent substrate 1a composed of glass, plastic or the like, a metal electrode 2a, an organic luminescent layer 3a, and a translucent electrode 4a are stacked in this order to thereby form a luminescent layer (organic electroluminescence element). Now, organic luminescent layers 3aR, 3aG, 3aB are stacks of various organic films, which respectively represent a red luminescent layer (3aR), a green luminescent layer (3aG), and a blue luminescent layer (3aB). There have been known configurations based on various combinations, for example, a stack of hole injection layer typically composed of a triphenylamine derivative, and a luminescent layer composed of a fluorescent organic solid such as anthracene; a stack of such luminescent layer and an electron injection layer composed of a perylene derivative or the like; and a stack of such hole injection layer, such luminescent layer, and such electron injection layer.

The organic EL image display apparatus has an insulating film 5a on a translucent electrode 4a, and further thereon a circularly polarizing plate 10a while placing an adhesive layer 6a in between. In the circularly polarizing plate 10a, a $\lambda/4$ plate 9a ($\lambda/4$ plate T1) is disposed on the viewer's side of the polarizer 8a, and a $\lambda/4$ plate 7a ($\lambda/4$ plate T2) is disposed on the organic luminescent layer 3a side (luminescent layer side) of the polarizer 8a.

The organic EL image display apparatus emits light according to the principle that holes and electrons, injected into the organic luminescent layer under voltage applied between the translucent electrode and the metal electrode, recombine to produce an energy, thereby the fluorescent materials are excited, and emit light when the excited fluorescent materials fall back to the ground state. The mechanism of recombination in the middle way is same as that of general diodes. As may be predicted from the mechanism, current and emission intensity are strongly nonlinear to applied voltage, accompanied by rectification.

In the organic EL image display apparatus, at least either one of the electrodes need be translucent in order to extract therethrough the light emitted from the organic luminescent layer. It is therefore general to use, as the anode, a translucent electrode composed of a translucent conductor such as indium thin oxide (ITO). On the other hand, in order to facilitate the electron injection to thereby increase emission efficiency, it is essential to use, for the cathode, a material having a small work function, so that it is general to use a metal electrode composed of Mg—Ag, Al—Li or the like.

In the thus-configured organic EL image display apparatus, the organic luminescent layer is formed using a film with an extremely small thickness of only 10 nm thick or around. Like the translucent electrode, also the organic luminescent layer now allows the light to transmit almost completely. In the non-luminescence period, the light enters the translucent base through the surface thereof, passes through the translucent electrode and the organic luminescent layer, reflected on the metal electrode, and exits the translucent base again into the outside of the surface. Accordingly, the display screen of the organic EL image display apparatus, when viewed from the outside, looks like a mirror.

In the organic EL image display apparatus, configured to have a translucent electrode provided to the front surface of the organic luminescent layer which illuminates under applied voltage, and to have a metal electrode provided to the back surface of the organic luminescent layer, it is also possible to provide a polarizing plate on the front surface side of the translucent electrode, and also to provide a phase difference plate (not illustrated) between the translucent electrode and the polarizing plate.

The phase difference plate and the polarizing plate polarize the light which comes from the outside and reflected on the metal electrode, and by means of such polarizing effect, they act to hide the mirror surface of the metal electrode from the external viewer. In particular, by configuring the phase difference plate using a $\lambda/4$ plate, and by adjusting the angle between the directions of polarization of the polarizing plate and the phase difference plate to $\pi/4$, it is now possible to completely hide the mirror surface of the metal electrode.

More specifically, when the external light enters the organic EL display apparatus, only the linearly polarized light component is allowed to pass by the polarizing plate. While the linearly polarized light is generally converted by the phase difference plate to elliptically polarized light, it is converted to circularly polarized light, particularly when the phase difference plate is configured by a quarter wave plate, and concurrently when the angle of the directions of polarization between the polarizing plate and the phase difference plate is set to $\pi/4$.

The circularly polarized light passes through the translucent base, the translucent electrode, and the organic film, reflected on the metal electrode, again passes through the organic film, the translucent electrode, and the translucent base, and again returned back to the linearly polarized light by the phase difference plate. Since the linearly polarized light crosses at right angles with the direction of polarization of the polarizing plate, it cannot pass through the polarizing plate. As a consequence, the mirror surface of the metal electrode may completely be hidden.

According to the embodiments and configurations mentioned above, it is now possible to suppress the crosstalk, to decrease in the luminance and changes in the hue, when the stereoscopic (3D) images are viewed with the head tilted, and to thereby provide the stereoscopic image display apparatus capable of keeping good visibility irrespective of the operating environment, and is highly durable against the operating environment.

EXAMPLE

The present invention will be detailed referring to Examples, without limiting the present invention.

Example 1

Manufacture of Film 1

<Preparation of Fine Particle Dispersion>

| | |
|---|---|
| Fine particle (Aerosil R8121, from Nippon Aerosil Co., Ltd.) | 11 parts by mass |
| Ethanol | 89 parts by mass |

The ingredients above were mixed under stirring using a dissolver for 50 minutes, and then dispersed in a Manton-Gaulin homogenizer to prepare a fine particle dispersion.

<Preparation of Addition Liquid 1 for Adding Fine Particle>

Into a tank containing 5 parts by mass of methylene chloride, which is kept thoroughly stirred, 5 parts by mass of the fine particle dispersion was slowly added. The mixture was then dispersed in an attritor so as to adjust the size of the secondary particle to a predetermined value. The dispersion was filtered through Fine Met NF from Nippon Seisen Co., Ltd., to thereby prepare an addition liquid 1 for adding fine particle.

<Preparation of Main Dope 1>

Main dope with the composition below was prepared. First, methylene chloride and ethanol were put in a pressure dissolving tank. The content was heated, the composition was thoroughly dissolved under stirring, and the content was filtered through Azumi filter paper No. 244 from Azumi Filter Paper Co., Ltd., to thereby prepare a main dope 1.

<Composition of Main Dope 1>

| | |
|---|---|
| Methylene chloride | 340 parts by mass |
| Ethanol | 64 parts by mass |
| Cellulose acetate propionate (degree of substitution by acetyl group = 1.53, degree of substitution by propionyl group = 0.91, total degree of substitution = 2.44, weight-average molecular weight Mw = 220,000) | 100 parts by mass |
| Sugar ester compound A | 5 parts by mass |
| Polyester B | 5 parts by mass |
| Tinuvin 928 (from BASF Japan Ltd.) | 2 parts by mass |
| Addition Liquid 1 for Adding Fine Particle | 2 parts by mass |

[Chemical Formula 7]

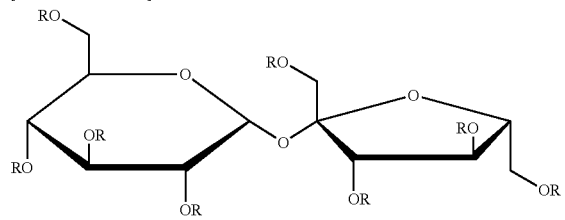

SUGAR ESTER COMPOUND A

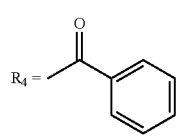

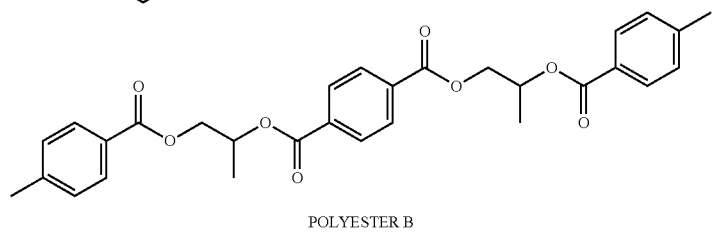

POLYESTER B

The main dope 1 was cast over a stainless steel belt support, the solvent was allowed to vaporize so that the amount of residual solvent in the cast film becomes 75% by mass, and the film was then separated from the stainless steel belt support under a peeling tension of 130 N/m.

The separated film was then stretched by 1% under heating at 160° C., using a tenter in the width-wise direction. The content of residual solvent at the start of stretching was 15% by mass.

Next, the film was dried while conveying it through a drying zone with the aid of a number of rollers. The drying temperature was 130° C., and the feeding tension was 100 N/m.

A rolled web film 1 having a dry thickness of 73 μm was obtained in this way.

The rolled web film 1 was set on a slidable feeding device, and was then fed to a diagonal stretcher of a diagonal stretching tenter apparatus (FIG. 3). In this process, the distance between the main shaft of the guide roller closest to the entrance portion of the diagonal stretching apparatus and the clips (clipping portions) of the diagonal stretching apparatus was set to 80 cm. The clip used herein was 2 inches long in the machine direction, and the guide roller was 10 cm in diameter. The film was stretched by 1.74 times in the width-wise direction using the tenter at a stretching temperature of 190° C., and then shrunk by 0.71 times in the direction normal to the direction of stretching when fed along the 45° bent portion of the rail. The stretched film was taken up while controlling variation in the take-up tension to smaller than 3%, by a feed-back control in which the number of rotation of a take-up motor is determined making reference to variations in the tension measured at the first roller on the exit side of the diagonal stretching tenter. The film was then trimmed at both ends, changed in the machine direction using a machine direction changer composed of an air flow roller, taken up by a slidable take-up device, to thereby obtain the rolled film 1 of 2000 mm wide.

The stretching of the film 1 was performed at a temperature of ((Tg of the film 1)+10)° C. Films 2 to 19 were manufactured in a similar way.

The Tg (glass transition temperature) was determined as a mean value of a temperature that a baseline starts to change due to glass transition of the film and a temperature that turns to a baseline again, when measured using differential scanning calorimeter (DSC) Q2000 (TA Instruments, Japan) at a temperature rising rate of 5° C./min.

Alignment angle θ of the film 1, measured using KOBRA-21ADH from Oji Scientific Instruments Co., Ltd., was found to fall in the range of 45°±1° away from the longitudinal direction of the film.

[Manufacture of Films 2 to 18]

Films 2 to 18 varied in the phase difference were manufactured, while varying manufacturing conditions including the degree of substitution of cellulose acetate, film thickness, factor of stretching and temperature, as listed in Table 1.

[Manufacture of Film 19]

Film 19 was manufactured as described below, referring to Example 4 of JP-A-2010-134232.

(Manufacture of Polycarbonate Copolymer Resin)

Heated and melted at 180° C. in a nitrogen atmosphere were 61.99 parts by mass of isosolbide (ISS), 124.12 parts by mass of 9,9-bis[4-(2-hydroxyethoxy)phenyl]fluorene (BPEF), 154.61 parts by mass of diphenylcarbonate, and as catalysts, $1.8 \times 10^{-2}$ parts by mass of tetramethylammonium hydroxide and $1.6 \times 10^{-4}$ parts by mass of sodium hydroxide. The degree of decompression was adjusted over 30 minutes down to 13.4 kPa. The content was then heated at a rate of 20° C./hr up to 260° C., kept at that temperature for 10 minutes, and the degree of decompression was adjusted over one hour down to 133 Pa. The content was allowed to react over 6 hours in total under stirring, to thereby obtain an aromatic-aliphatic polycarbonate copolymer.

(Manufacture of Film 19)

Next, using the thus-manufactured, aromatic-aliphatic polycarbonate copolymer, a film (84±0.8 µm thick) was manufactured in the same way with the film 1. Tg of the obtained film were evaluated similarly to that of the film 1. The film was uniaxially stretched by 2.0 times at Tg+10° C. similarly to the film 1, to thereby obtain a film 19 of 200 mm long, 57 mm wide, and 64 µm thick.

[Evaluation and Measurement]

The thus-manufactured films 1 to 19 were measured regarding the items below. Results were shown in Table 1.

[Retardation and Wavelength Dispersion]

In-plane retardation Ro(450) at 450 nm, and in-plane retardation Ro(550) at 550 nm were measured using AxoScan OPMF from Opto Science, Inc., in an environment of 23° C., 55% RH.

In addition, in-plane retardation Ro(650) at 650 nm was measured. Wavelength dispersion was expressed in ratio given by Ro(550)/Ro(650).

TABLE 1

| | FILM No. | 1 | 2 | 3 | 4 | 5 | 6 | 7 | 8 | 9 | 10 | 11 |
|---|---|---|---|---|---|---|---|---|---|---|---|---|
| DEGREE OF SUBSTITUTION OF CELLULOSE ESTER | ACETYL GROUP | 1.53 | 1.53 | 1.53 | 1.53 | 1.53 | 1.20 | 1.20 | 1.20 | 1.20 | 0.50 | 0.50 |
| | PROPIONYL GROUP | 0.91 | 0.91 | 0.91 | 0.91 | 0.91 | 1.50 | 1.50 | 1.50 | 1.50 | 1.50 | 1.50 |
| | TOTAL | 2.44 | 2.44 | 2.44 | 2.44 | 2.44 | 2.70 | 2.70 | 2.70 | 2.70 | 2.00 | 2.00 |
| FILM STRETCHING CONDITION | STRETCHING TEMPERATURE (° C.) | 190 | 190 | 190 | 190 | 190 | 190 | 187 | 190 | 184 | 200 | 200 |
| | STRETCHING FACTOR (TIMES) | 1.74 | 1.78 | 1.85 | 1.70 | 1.66 | 2.50 | 2.50 | 2.20 | 2.50 | 1.75 | 1.80 |
| | DIRECTION OF STRETCHING | *2 | *2 | *2 | *2 | *2 | *2 | *2 | *2 | *2 | *2 | *2 |
| | FILM THICKNESS (µm) | 60 | 60 | 60 | 60 | 60 | 80 | 80 | 80 | 80 | 30 | 30 |
| *1 | Ro(450) (nm) | 137 | 140 | 147 | 132 | 122 | 110 | 117 | 103 | 118 | 138 | 147 |
| | Ro(550) (nm) | 140 | 143 | 150 | 135 | 125 | 140 | 148 | 130 | 150 | 139 | 148 |
| | Ro(650) (nm) | 143 | 146 | 153 | 138 | 128 | 156 | 164 | 144 | 167 | 140 | 149 |
| WAVELENGTH DISPERSION (Ro(550)/Ro(650)) | | 0.98 | 0.98 | 0.98 | 0.98 | 0.98 | 0.90 | 0.90 | 0.90 | 0.90 | 0.99 | 0.99 |

| | | FILM No. | 12 | 13 | 14 | 15 | 16 | 17 | 18 | 19 |
|---|---|---|---|---|---|---|---|---|---|---|
| | DEGREE OF SUBSTITUTION OF CELLULOSE ESTER | ACETYL GROUP | 0.50 | 0.50 | 1.25 | 1.25 | 0.40 | 0.40 | 1.53 | — |
| | | PROPIONYL GROUP | 1.50 | 1.50 | 1.50 | 1.50 | 1.50 | 1.50 | 0.91 | — |
| | | TOTAL | 2.00 | 2.00 | 2.75 | 2.75 | 1.90 | 1.90 | 2.44 | — |
| | FILM STRETCHING CONDITION | STRETCHING TEMPERATURE (° C.) | 200 | 200 | 180 | 177 | 200 | 197 | 190 | 168 |
| | | STRETCHING FACTOR (TIMES) | 1.78 | 1.76 | 2.50 | 2.50 | 1.75 | 1.75 | 1.76 | 2.00 |
| | | DIRECTION OF STRETCHING | *2 | *2 | *2 | *2 | *2 | *2 | *2 | MACHINE DIRECTION |
| | | FILM THICKNESS (µm) | 30 | 30 | 200 | 200 | 25 | 25 | 60 | 64 |
| | *1 | Ro(450) (nm) | 144 | 141 | 110 | 113 | 130 | 148 | 139 | 137 |
| | | Ro(550) (nm) | 145 | 142 | 141 | 145 | 130 | 148 | 142 | 148 |
| | | Ro(650) (nm) | 146 | 143 | 160 | 165 | 130 | 148 | 145 | 153 |
| | WAVELENGTH DISPERSION (Ro(550)/Ro(650)) | | 0.99 | 0.99 | 0.88 | 0.88 | 1.00 | 1.00 | 0.98 | 0.97 |

*1: IN-PLANE RETARDATION VALUE
*2: DIAGONAL

[Manufacture of Circularly Polarizing Plates 101 to 117]

A polyvinyl alcohol film of 120 μm thick was uniaxially stretched (temperature=110° C., stretching factor=5).

The film was then immersed in an aqueous solution composed of 0.075 g of iodine, 5 g of potassium iodide and 100 g of water for 60 seconds, and then immersed in an aqueous solution composed of 6 g of potassium iodide, 7.5 g of boric acid and 100 g of water at 68° C. The film was washed with water and dried, to thereby obtain a polarizer.

Next, according to the steps 1 to 5 described below and according to combinations listed in Table 2, Table 3 and Table 4, the λ/4 plate T1 (luminescent layer side), the polarizer, and the λ/4 plate T2 (viewer's side) were bonded roll-to-roll, while aligning the longitudinal direction, to thereby manufacture circularly polarizing plates 101 to 117.

Step 1: The λ/4 plate T1 and the λ/4 plate T2 were immersed in a 2 mol/L sodium hydroxide solution at 60° C. for 90 seconds, washed with water and dried, to thereby saponify the surface to be bonded with the polarizer.

Step 2: The polarizer was immersed in a polyvinyl alcohol adhesive bath having a solid content of 2% by mass for 1 to 2 seconds.

Step 3: Excessive adhesive adhered on the polarizer in Step 2 was lightly wiped off, and the polarizer was placed between the λ/4 plate T1 and the λ/4 plate T2 treated in Step 1.

Step 4: The λ/4 plate T1, the polarizer and the λ/4 plate T2 stacked in Step 3 were bonded under a pressure of 20 to 30 N/cm at a feeding speed of approximately 2 m/min.

Step 5: The samples, obtained in Step 4 by bonding the λ/4 plate T1, the polarizer and the λ/4 plate T2, after respectively cut into 1296 mm×784 mm rectangles, were dried in a drying oven at 80° C. for 2 minutes, to thereby manufacture circularly polarizing plates 101 to 117.

For the circularly polarizing plate 104, the λ/4 plates T1 and T2 were bonded so as to cross the directions of stretching of the two, whereas for the other polarizing plates, they were bonded so as to match the directions of stretching.

[Manufacture of Circularly Polarizing Plate 118]

In Step 3 in the manufacture of the circularly polarizing plates 101 to 117, the films 4, 19 and the polarizer, preliminarily cut into 1296 mm×784 mm rectangles, were bonded in the same way, to thereby manufacture a circularly polarizing plate 118. In the process of cutting, the film 4 and the polarizer were cut so as to align the longitudinal directions thereof (direction in a length of 1296 mm) in parallel with the machine direction, and film 19 was cut so as to align the longitudinal direction thereof 45° away from the machine direction.

The thus manufactured circularly polarizing plates were measured regarding the tension of the λ/4 plates T1 and T2 used therein in four directions, that is, machine direction (longitudinal direction for the circularly polarizing plate 118), width-wise direction (transverse direction for the circularly polarizing plate 118), direction 45° away from the machine direction (longitudinal direction for the circularly polarizing plate 118), and the direction −45° away from the same. Ratios given by (tension of T1)/(tension of T2) were determined, and shown in Tables 2, 3 and 4.

[Measurement of Tension]

The samples were controlled for humidity in an environment of 23° C., 55% RH for 24 hours, and then subjected to measurement specified in JIS K7127 using a tensile tester Tensilon RTA-100 from Orientec Co., Ltd., to thereby determine elastic modulus. Specimens have a geometry of Type-1 specimen, and measured at a test speed of 10 mm/min. The thus-determined elastic modulus multiplied by the film thickness gives tension.

Tension (kN/m)=Elastic modulus (GPa)×Film thickness (μm)

Example 2

Manufacture of Organic Electroluminescence Image Display Apparatus Compatible with Stereoscopic Images Next, an organic electroluminescence display apparatus was manufactured according to the procedures below.

The organic EL display apparatus of this Example was manufactured by forming on a glass substrate a 80 nm-thick reflective electrode composed of chromium by sputtering, forming on the reflective electrode a 40 nm-thick anode by sputtering ITO, forming on the anode a 80 nm-thick hole transport layer by sputtering poly(3,4-ethylenedioxythiophene)-polystyrene sulfonate (PEDOT:PSS), and by forming on the hole transport layer 100 nm-thick luminescent layers individually for RGB. The 100 nm-thick red luminescent layer was formed by codeposition using aluminum tris (8-hydroxyquinolinate) (Alq₃) as a host and [4-(dicyanomethylene)-2-methyl-6-(p-dimethylaminostyryl)-4H-pyran] (DCM) as an luminescent compound (in a ratio by mass of 99:1). The 100 nm-thick green luminescent layer was formed by codeposition using Alq₃ as a host and Coumarin 6 as a luminescent compound (in a ratio by mass of 99:1). The 100 nm-thick blue luminescent layer was formed by codeposition using BAlq as a host and Perylene as a luminescent compound (in a ratio by mass of 90:10).

[Chemical Formula 8]

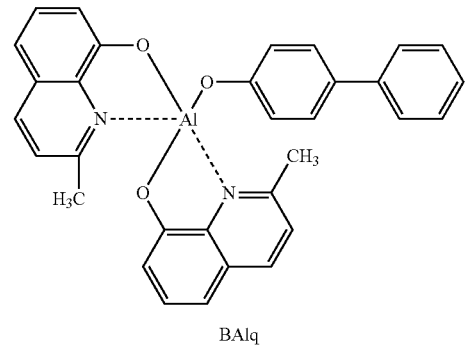

BAlq

Further on the luminescent layers, calcium was deposited by vacuum evaporation to thereby form a 4 nm-thick first cathode having a small work function directed to efficient electron injection, and aluminum was deposited on the first cathode to thereby form a 2 nm-thick second cathode. Aluminum used herein as the second cathode acts to prevent calcium, composing the first cathode, from being chemically modified when the translucent electrode is formed thereon by sputtering. The organic luminescent layer was obtained in this way. Next, a 80 nm-thick translucent conductive layer was formed on the cathode by sputtering. The translucent conductive layer herein was formed using ITO. Further on the translucent conductive layer, silicon nitride was deposited by CVD to thereby form a 200 nm-thick insulating film.

The thus-manufactured organic EL display apparatus was opposed with each of the circularly polarizing plates 101 to 118 which was configured by providing the λ/4 plates relevant to the present invention to both surfaces of the polarizer, and then fixed using the adhesive layers, to thereby manufacture the organic electroluminescence image display apparatus compatible with stereoscopic images.

Results of the evaluation were shown in Tables 2, 3 and 4. In Tables 2, 3 and 4, "difference of Ro between T1 and T2" means "(Ro of T1)−(Ro of T2)."

[Evaluation of Red Phase Based on External Light Reflection]

The display apparatus thus manufactured was allowed to stand in a room at 23° C., 55% RH for 48 hours, then placed in an environment with an illuminance of 100 lx, while keeping the display apparatus in a non-luminescent state under no applied voltage, the level of red phase of the reflected colors was visually observed from the right front, and the differences were compared.

⊚: No external light reflection sensible.
○: Slight redness due to external light reflection, but not so much noticeable.
Δ: Redness due to external light reflection noticeable.
x: Redness due to external light reflection much noticeable.

[Evaluation of Panel Warp]

Figure 4:
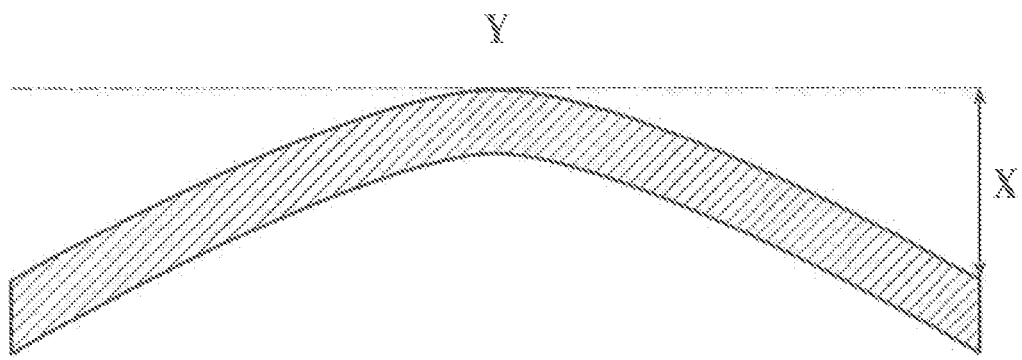
FIG. 4 is a conceptual drawing explaining panel warp.

The display apparatus (1296 mm×784 mm) manufactured as described above was allowed to stand at 40° C., 25% RH for 1000 hours, and the panel warp was evaluated. FIG. 4 is a drawing illustrating the panel viewed from the top. Length Yi n the longitudinal direction of the panel, and displacement X of the edge away from the level of the longitudinal center of panel, illustrated in FIG. 4, were measured.

[Evaluation of Crosstalk]

Effect of preventing external light reflection and crosstalk were visually evaluated from the right front, through 3D spectacles TDG-BR100 from SONY Corporation.

⊚: No crosstalk observed.
○: Crosstalk almost not noticeable.
Δ: Blue crosstalk noticeable.
x: Blue crosstalk much noticeable.

TABLE 2

| CIRCULARLY POLARIZING PLATE No. | | 101 | 102 | 103 | 104 | 105 | 106 | 107 |
|---|---|---|---|---|---|---|---|---|
| FILM No. | λ/4 PLATE T1 | 1 | 1 | 1 | 1 | 4 | 4 | 2 |
| | λ/4 PLATE T2 | 1 | 2 | 3 | 3 | 3 | 18 | 3 |
| DEGREE OF SUBSTITUTION OF | λ/4 PLATE T1 | 2.44 | 2.44 | 2.44 | 2.44 | 2.44 | 2.44 | 2.44 |
| CELLULOSE ESTER | λ/4 PLATE T2 | 2.44 | 2.44 | 2.44 | 2.44 | 2.44 | 2.44 | 2.44 |
| FILM STRETCHING CONDITIONS — STRETCHING TEMPERATURE (° C.) | λ/4 PLATE T1 | 190 | 190 | 190 | 190 | 190 | 190 | 190 |
| | λ/4 PLATE T2 | 190 | 190 | 190 | 190 | 190 | 190 | 190 |
| STRETCHING FACTOR (TIMES) | λ/4 PLATE T1 | 1.74 | 1.74 | 1.74 | 1.74 | 1.70 | 1.70 | 1.78 |
| | λ/4 PLATE T2 | 1.74 | 1.78 | 1.85 | 1.85 | 1.85 | 1.76 | 1.85 |
| DIRECTION OF STRETCHING | λ/4 PLATE T1 | *1 | *1 | *1 | *1 | *1 | *1 | *1 |
| | λ/4 PLATE T2 | *1 | *1 | *1 | *1 | *1 | *1 | *1 |
| DIRECTION OF AXES IN BONDING | | *2 | *2 | *2 | *3 | *2 | *2 | *2 |
| METHOD OF BONDING | | *4 | *4 | *4 | *4 | *4 | *4 | *4 |
| FILM THICKNESS (μm) | λ/4 PLATE T1 | 60 | 60 | 60 | 60 | 60 | 60 | 60 |
| | λ/4 PLATE T2 | 60 | 60 | 60 | 60 | 60 | 60 | 60 |
| IN-PLANE RETARDATION VALUE — Ro(450) (nm) | λ/4 PLATE T1 | 137 | 137 | 137 | 137 | 132 | 132 | 140 |
| | λ/4 PLATE T2 | 137 | 140 | 147 | 147 | 147 | 139 | 147 |
| | DIFFERENCE OF Ro BETWEEN T1 AND T2 | 0 | −3 | −10 | −10 | −15 | −7 | −7 |
| Ro(550) (nm) | λ/4 PLATE T1 | 140 | 140 | 140 | 140 | 135 | 135 | 143 |
| | λ/4 PLATE T2 | 140 | 143 | 150 | 150 | 150 | 142 | 150 |
| | DIFFERENCE OF Ro BETWEEN T1 AND T2 | 0 | −3 | −10 | −10 | −15 | −7 | −7 |
| Ro(650) (nm) | λ/4 PLATE T1 | 143 | 143 | 143 | 143 | 138 | 138 | 146 |
| | λ/4 PLATE T2 | 143 | 146 | 153 | 153 | 153 | 145 | 153 |
| | DIFFERENCE OF Ro BETWEEN T1 AND T2 | 0 | −3 | −10 | −10 | −15 | −7 | −7 |
| RATIO OF TENSION (T1/T2) | MACHINE DIRECTION | 1.0 | 1.0 | 1.0 | 1.0 | 1.0 | 1.0 | 1.0 |
| | TRANSVERSE DIRECTION | 1.0 | 1.0 | 1.0 | 1.0 | 1.0 | 1.0 | 1.0 |
| | 45° DIRECTION | 1.0 | 1.0 | 1.1 | 1.4 | 1.1 | 1.1 | 1.1 |
| | −45° DIRECTION | 1.0 | 1.0 | 0.9 | 0.6 | 0.9 | 0.9 | 0.9 |
| RESULTS OF EVALUATION | RED PHASE | X | ○ | ⊚ | ○ | ○ | ○ | ○ |
| | BLUE CROSSTALK | Δ | ○ | ○ | ○ | ○ | ○ | ○ |
| | PANEL WARP (mm) | 0 | 0 | 0 | 20 | 4 | 4 | 4 |
| REMARKS | | *5 | *6 | *6 | *6 | *6 | *6 | *6 |

*1: DIAGONAL
*2: PARALLEL
*3: ORTHOGONAL
*4: ROLL-TO-ROLL
*5: COMPARATIVE EXAMPLE
*6: PRESENT INVENTION

TABLE 3

| CIRCULARLY POLARIZING PLATE No. | | 108 | 109 | 110 | 111 | 112 | 113 | 114 |
|---|---|---|---|---|---|---|---|---|
| FILM No. | λ/4 PLATE T1 | 5 | 5 | 6 | 8 | 6 | 10 | 12 |
| | λ/4 PLATE T2 | 2 | 3 | 7 | 7 | 9 | 11 | 11 |
| DEGREE OF SUBSTITUTION OF | λ/4 PLATE T1 | 2.44 | 2.44 | 2.70 | 2.70 | 2.70 | 2.00 | 2.00 |
| CELLULOSE ESTER | λ/4 PLATE T2 | 2.44 | 2.44 | 2.70 | 2.70 | 2.70 | 2.00 | 2.00 |
| FILM STRETCHING CONDITIONS — STRETCHING TEMPERATURE (° C.) | λ/4 PLATE T1 | 190 | 190 | 190 | 190 | 190 | 200 | 200 |
| | λ/4 PLATE T2 | 190 | 190 | 187 | 187 | 184 | 200 | 200 |
| STRETCHING FACTOR (TIMES) | λ/4 PLATE T1 | 1.66 | 1.66 | 2.50 | 2.20 | 2.50 | 1.75 | 1.78 |
| | λ/4 PLATE T2 | 1.78 | 1.85 | 2.50 | 2.50 | 2.50 | 1.80 | 1.80 |

TABLE 3-continued

| CIRCULARLY POLARIZING PLATE No. | | | 108 | 109 | 110 | 111 | 112 | 113 | 114 |
|---|---|---|---|---|---|---|---|---|---|
| | DIRECTION OF STRETCHING | λ/4 PLATE T1 | *1 | *1 | *1 | *1 | *1 | *1 | *1 |
| | | λ/4 PLATE T2 | *1 | *1 | *1 | *1 | *1 | *1 | *1 |
| DIRECTION OF AXES IN BONDING | | | *2 | *2 | *2 | *2 | *2 | *2 | *2 |
| METHOD OF BONDING | | | *3 | *3 | *3 | *3 | *3 | *3 | *3 |
| FILM THICKNESS (μm) | | λ/4 PLATE T1 | 60 | 60 | 80 | 80 | 80 | 30 | 30 |
| | | λ/4 PLATE T2 | 60 | 60 | 80 | 80 | 80 | 30 | 30 |
| IN-PLANE RETARDATION VALUE | Ro(450) (nm) | λ/4 PLATE T1 | 122 | 122 | 110 | 103 | 110 | 138 | 144 |
| | | λ/4 PLATE T2 | 140 | 147 | 117 | 117 | 118 | 147 | 147 |
| | | DIFFERENCE OF Ro BETTWEEN T1 AND T2 | −18 | −25 | −7 | −14 | −8 | −9 | −3 |
| | Ro(550) (nm) | λ/4 PLATE T1 | 125 | 125 | 140 | 130 | 140 | 139 | 145 |
| | | λ/4 PLATE T2 | 143 | 150 | 148 | 148 | 150 | 148 | 148 |
| | | DIFFERENCE OF Ro BETTWEEN T1 AND T2 | −18 | −25 | −8 | −18 | −10 | −9 | −3 |
| | Ro(650) (nm) | λ/4 PLATE T1 | 128 | 128 | 156 | 144 | 156 | 140 | 146 |
| | | λ/4 PLATE T2 | 146 | 153 | 164 | 164 | 167 | 149 | 149 |
| | | DIFFERENCE OF Ro BETTWEEN T1 AND T2 | −18 | −25 | −8 | −20 | −11 | −9 | −3 |
| RATIO OF TENSION (T1/T2) | | MACHINE DIRECTION | 1.0 | 1.0 | 1.0 | 1.0 | 1.0 | 1.0 | 1.0 |
| | | TRANSVERSE DIRECTION | 1.0 | 1.0 | 1.0 | 1.0 | 1.0 | 1.0 | 1.0 |
| | | 45° DIRECTION | 1.1 | 1.1 | 1.0 | 1.0 | 1.0 | 1.0 | 1.0 |
| | | −45° DIRECTION | 0.9 | 0.9 | 1.0 | 1.0 | 1.0 | 1.0 | 1.0 |
| RESULTS OF EVALUATION | | RED PHASE | ○ | Δ | ⊚ | ○ | X | ○ | ○ |
| | | SLUE CROSSTALK | ○ | X | ⊚ | X | ○ | ○ | X |
| | | PANEL WARP (mm) | 4 | 4 | 0 | 0 | 0 | 0 | 0 |
| REMARKS | | | *5 | *4 | *5 | *4 | *4 | *5 | *4 |

*1: DIAGONAL
*2: PARALLEL
*3: ROLL-TO-ROLL
*4: COMPARATIVE EXAMPLE
*5: PRESENT INVENTION

TABLE 4

| CIRCULARLY POLARIZING PLATE No. | | | 115 | 116 | 117 | 118 |
|---|---|---|---|---|---|---|
| FILM No. | | λ/4 PLATE T1 | 10 | 14 | 16 | 4 |
| | | λ/4 PLATE T2 | 13 | 15 | 17 | 19 |
| DEGREE OF SUBSTITUTION OF CELLULOSE ESTER | | λ/4 PLATE T1 | 2.00 | 2.75 | 1.90 | 2.44 |
| | | λ/4 PLATE T2 | 2.00 | 2.75 | 1.90 | — |
| FILM STRETCHING CONDITIONS | STRETCHING TEMPERATURE (° C.) | λ/4 PLATE T1 | 200 | 180 | 200 | 190 |
| | | λ/4 PLATE T2 | 200 | 177 | 197 | 168 |
| | STRETCHING FACTOR (TIMES) | λ/4 PLATE T1 | 1.75 | 2.50 | 1.75 | 1.70 |
| | | λ/4 PLATE T2 | 1.76 | 2.50 | 1.75 | 2.00 |
| | DIRECTION OF STRETCHING | λ/4 PLATE T1 | *1 | *1 | *1 | *1 |
| | | λ/4 PLATE T2 | *1 | *1 | *1 | MACHINE DIRECTION |
| DIRECTION OF AXES IN BONDING | | | *2 | *2 | *2 | *2 |
| METHOD OF BONDING | | | *3 | *3 | *3 | BONDING |
| FILM THICKNESS (μm) | | λ/4 PLATE T1 | 30 | 200 | 25 | 60 |
| | | λ/4 PLATE T2 | 30 | 200 | 25 | 64 |
| IN-PLANE RETARDATION VALUE | Ro(450) (nm) | λ/4 PLATE T1 | 138 | 110 | 130 | 132 |
| | | λ/4 PLATE T2 | 141 | 113 | 148 | 137 |
| | | DIFFERENCE OF Ro BETTWEEN T1 AND T2 | −3 | −3 | −18 | −5 |
| | Ro(550) (nm) | λ/4 PLATE T1 | 139 | 141 | 130 | 135 |
| | | λ/4 PLATE T2 | 142 | 145 | 148 | 148 |
| | | DIFFERENCE OF Ro BETTWEEN T1 AND T2 | −3 | −4 | −18 | −13 |
| | Ro(650) (nm) | λ/4 PLATE T1 | 140 | 160 | 130 | 138 |
| | | λ/4 PLATE T2 | 143 | 165 | 148 | 153 |
| | | DIFFERENCE OF Ro BETTWEEN T1 AND T2 | −3 | −5 | −18 | −15 |
| RATIO OF TENSION (T1/T2) | | MACHINE DIRECTION | 1.0 | 1.0 | 1.0 | 1.0 |
| | | TRANSVERSE DIRECTION | 1.0 | 1.0 | 1.0 | 1.0 |
| | | 45° DIRECTION | 1.0 | 1.0 | 1.0 | 1.3 |
| | | −45° DIRECTION | 1.0 | 1.0 | 1.0 | 0.7 |

TABLE 4-continued

| CIRCULARLY POLARIZING PLATE No. | | 115 | 116 | 117 | 118 |
|---|---|---|---|---|---|
| RESULTS OF EVALUATION | RED PHASE | X | ○ | Δ | ⊚ |
| | BLUE CROSSTALK | Δ | ○ | Δ | ○ |
| | PANEL WARP (mm) | 0 | 0 | 0 | 9 |
| REMARKS | | *4 | *5 | *5 | *5 |

*1: DIAGONAL
*2: PARALLEL
*3: ROLL-TO-ROLL
*4: COMPARATIVE EXAMPLE
*5: PRESENT INVENTION

As is clear from the results shown above, the circularly polarizing plate of the present invention is much smaller in hue degradation and crosstalk due to external light reflection, and better in visibility, as compared with the circularly polarizing plate of Comparative Examples. It was also confirmed that the panel warp was successfully suppressed by adjusting the ratio of tension of λ/4 plates T1 and T2 in appropriate ranges in four in-plane directions.

The λ/4 plate manufactured by diagonal stretching was found to enable roll-to-roll manufacture of the polarizing plate, with good productivity.

INDUSTRIAL APPLICABILITY

The circularly polarizing plate of the present invention may be used for manufacturing the circularly polarizing plate of the organic electroluminescence image display apparatus with a stereoscopic image display function, and for manufacturing the organic electroluminescence image display apparatus with a stereoscopic image display function, which incorporates the circularly polarizing plate.

What is claimed is:

1. A circularly polarizing plate comprising a polarizer and two λ/4 plates bonded on both sides of the polarizer so as to face each other,
wherein in-plane retardation values Ro of one λ/4 plate (referred to as "λ/4 plate T1", hereinafter) and other λ/4 plate (referred to as "λ/4 plate T2", hereinafter) satisfy following conditions (a) to (c), when measured in an environment with a temperature of 23° C. and a relative humidity of 55%:
  (a) the in-plane retardation value Ro of the λ/4 plate T1 is 3.0 to 20.0 nm smaller than the in-plane retardation value Ro of the λ/4 plate T2, when measured in the range from 450 to 650 nm;
  (b) the in-plane retardation value Ro(450) of the λ/4 plate T1 measured at a measurement wavelength of 450 nm falls in the range from 110 to 140 nm; and
  (c) the in-plane retardation value Ro(650) of the λ/4 plate T2 measured at a measurement wavelength of 650 nm falls in the range from 145 to 165 nm.

2. The circularly polarizing plate according to claim 1, wherein both of the λ/4 plate T1 and the λ/4 plate T2 contain 70% by mass or more of a cellulose acetate having a total degree of acyl substitution in the range from 2.0 to 2.7.

3. The circularly polarizing plate according to claim 1, wherein both of the λ/4 plate T1 and the λ/4 plate T2 are formed by diagonal stretching.

4. The circularly polarizing plate according to claim 1, wherein a tension of the λ/4 plate T2, defined by an equation below, relative to a tension of the λ/4 plate T1 falls in the range from 0.7 to 1.30 in an entire plane bonded to the polarizer:

tension=elastic modulus×film thickness (kN/m)  (Equation).

5. A three-dimensional image display apparatus, comprising the circularly polarizing plate according to claim 1 and an organic electroluminescent element.

* * * * *